United States Patent
Kato et al.

(10) Patent No.: US 6,556,679 B1
(45) Date of Patent: Apr. 29, 2003

(54) COPY-GUARD SYSTEM AND INFORMATION RECORDING MEDIUM USED IN THE SAME SYSTEM

(75) Inventors: Takehisa Kato, Yokohama (JP); Taku Katoh, Kamakura (JP); Kenjiro Endoh, Tokyo (JP); Hisashi Yamada, Yokohama (JP); Naoki Endoh, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/195,914

(22) Filed: Nov. 19, 1998

(30) Foreign Application Priority Data

Nov. 20, 1997 (JP) .............................. 9-361981

(51) Int. Cl.⁷ .............................................. H04N 7/167
(52) U.S. Cl. ...................... 380/203; 380/201; 705/51; 705/57; 705/58; 713/176; 713/200
(58) Field of Search ................................. 713/176, 200; 380/201, 202, 203; 705/57, 58, 51

(56) References Cited

U.S. PATENT DOCUMENTS

| | | | | |
|---|---|---|---|---|
| 5,699,434 A | * | 12/1997 | Hogan | 380/217 |
| 5,809,139 A | * | 9/1998 | Girod et al. | 380/202 |
| 5,828,754 A | * | 10/1998 | Hogan | 341/58 |
| 5,915,027 A | * | 6/1999 | Cox et al. | 380/54 |
| 6,005,839 A | * | 12/1999 | Sako et al. | 369/275.3 |
| 6,052,465 A | * | 4/2000 | Gotoh et al. | 269/53.21 |
| 6,289,102 B1 | * | 9/2001 | Ueda et al. | 380/201 |
| 6,301,663 B1 | * | 10/2001 | Kato et al. | 380/201 |

OTHER PUBLICATIONS

Schneier, "Applied Cryptography, 2$^{nd}$ Edition," Section 3.1, pp. 47–52, 1996.*
Tatebayashi et al., "DVD Copyright Protection System," Technical Report of the Institute of Image Information and Television Engineers, May 22, 1997 ("DVD Content Scramble System")–Eng. Abstract.
Tatebayashi et al., "DVD–Equipped Personal Computer," Nikkei Electronics, Aug. 18, 1997, No. 696, pp. 110–120.

* cited by examiner

*Primary Examiner*—Gilberto Barron
*Assistant Examiner*—Paul E. Callahan
(74) *Attorney, Agent, or Firm*—Finnegan, Henderson, Farabow, Garrett & Dunner, L.L.P.

(57) ABSTRACT

In an embodiment, a copy-guard system is provided that includes a decoding section for decoding digital data, which is encoded and error-correction-coded, from an information recording medium in which key information encoded for the digital data is recorded, an encoded digital data acquisition section for acquiring digital data encoded by error-correcting the digital data decoded by the decoding section, a detection section for detecting an error position and an error symbol value of the encoded digital data, identification information detection section for detecting an identification information representing whether the information recording medium is original or copied and which is replaced with a part of the digital data encoded and error-correction-coded, based on the error position and the error symbol value detected by the detection section, a determination section for determining whether a copy of the information recording medium is protected, and a copy protection section.

40 Claims, 15 Drawing Sheets

COPY-GUARD SYSTEM AND INFORMATION RECORDING MEDIUM USED IN THE SAME SYSTEM

BACKGROUND OF THE INVENTION

The present invention relates to a copy-guard system for determining whether multimedia data recorded on a recording medium is original or copied and then preventing the data from being copied illegally when it is not original.

The present invention also relates to an information recording medium used in the above copy-guard system.

In a digital recording medium such as a DAT (Digital Audio Tape) and an MD (Mini Disc), a digital copy of the original can be made only once but a copy of the copied data (secondary copy) cannot be made again. This is called a CGMS (Copy Generation Management System) or an SCMS (Single Copy Management System). In these systems, a two-bit flag indicates whether data has been copied or not (data can be copied or not).

However, they have a problem in which data is likely to be altered and copied illegally during its transmission or a so-called pirated medium is likely to circulate.

Consequently, the conventional copy-guard system has such a problem as described above.

BRIEF SUMMARY OF THE INVENTION

The present invention has been developed in consideration of the above situation, and its object is to provide a copy-guard system for preventing an unauthorized copy based on identification information which represents whether the contents recorded on an information recording medium are the original or not and which is recorded in an error-correction code.

Another object of the present invention is to provide an information recording medium used in the above copy-guard system.

In order to attain the above objects, according to a first aspect of the present invention, there is provided a copy-guard system comprising:

first decoding means for decoding digital data, which is encoded and error-correction-coded, from an information recording medium in which key information encoded for the digital data is recorded;

encoded digital data acquisition means for acquiring digital data encoded by error-correcting the digital data decoded by the first decoding means;

detection means for detecting an error position and an error symbol value of the encoded digital data acquired by the encoded digital data acquisition means;

identification information detection means for replacing the digital data encoded and error-correction-coded with part of the digital data encoded and error-correction-coded, based on the error position and the error symbol value detected by the detection means and then recording the part of the digital data thereby to detect identification information representing whether the information recording medium is original or copied;

first determination means for determining whether a copy of the information recording medium is protected based on the identification information detected by the identification information detection means; and copy protection means for protecting a copy of the information recording medium based on determination results of the first determination means.

According to a second aspect of the present invention, there is provided a copy-guard system comprising:

first decoding means for decoding digital data, which is encoded and error-correction-coded by a product code, from an information recording medium in which key information encoded for the digital data is recorded;

first acquisition means for acquiring digital data encoded and error-correction-coded by an inner code when the digital data decoded by the first decoding means is error-corrected by an outer code;

detection means for detecting an error position and an error symbol value of the digital data acquired by the first acquisition means;

identification information detection means for replacing the digital data encoded and error-correction-coded by the inner code with part of the digital data encoded and error-correction-coded by the inner code, based on the error position and the error symbol value detected by the detection means and then recording the part of the digital data thereby to detect identification information representing whether the information recording medium is original or copied;

first determination means for determining whether a copy of the information recording medium is protected based on the identification information detected by the identification information detection means; and copy protection means for protecting a copy of the information recording medium based on determination results of the first determination means.

According to a third aspect of the present invention, there is provided a copy-guard system comprising:

first decoding means for decoding digital data, which is encoded and error-correction-coded by a product code, from an information recording medium in which key information encoded for the digital data is recorded;

first acquisition means for acquiring digital data encoded and error-correction-coded by an inner code when the digital data decoded by the first decoding means is error-corrected by an outer code;

first detection means for detecting a first error position and a first error symbol value of the digital data acquired by the first acquisition means;

second acquisition means for acquiring digital data encoded by error-correcting the digital data, which is acquired by the first acquisition means, by the inner code;

second detection means for detecting a second error position and a second error symbol value of the encoded digital data acquired by the second acquisition means;

identification information detection means for replacing the digital data encoded and error-correction-coded with part of the digital data encoded and error-correction-coded by the product code, based on the first error position and the first error symbol value detected by the first detection means and the second error position and the second error symbol value detected by the second detection means, and then recording the part of the digital data thereby to detect identification information representing whether the information recording medium is original or copied;

first determination means for determining whether a copy of the information recording medium is protected based on the identification information detected by the identification information detection means; and copy protection means for protecting a copy of the information recording medium based on determination results of the first determination means.

According to a fourth aspect of the present invention, there is provided a copy-guard system comprising:

first decoding means for decoding digital data, which is encoded and error-correction-coded by a product code, from an information recording medium in which key information encoded for the digital data is recorded;

identification information detection means for replacing the digital data with part of the digital data and then recording the part of the digital data, thereby to detect identification information of the digital data decoded by the first decoding means, based on a pattern of identification information representing whether the information recording medium is original or copied;

first determination means for determining whether a copy of the information recording medium is protected based on the identification information detected by the identification information detection means; and copy protection means for protecting a copy of the information recording medium based on determination results of the first determination means.

According to a fifth aspect of the present invention, there is provided a copy-guard system comprising:

first decoding means for decoding digital data, which is encoded and error-correction-coded, from an information recording medium in which key information encoded for the digital data is recorded;

encoded digital data acquisition means for acquiring digital data encoded by error-correcting the digital data decoded by the first decoding means;

detection means for detecting an error position and an error symbol value of the encoded digital data acquired by the encoded digital data acquisition means;

second decoding means for decoding the digital data acquired by the encoded digital data acquisition means;

extraction means for extracting positional information of identification information, which is embedded in the digital data decoded by the second decoding means, as watermark data;

identification information detection means for replacing the digital data encoded and error-correction-coded with part of the digital data encoded and error-correction-coded, based on the error position and the error symbol value detected by the detection means and the positional information of the identification information extracted by the extraction means, and then recording the part of the digital data thereby to detect identification information representing whether the information recording medium is original or copied;

determination means for determining whether a copy of the information recording medium is protected based on the identification information detected by the identification information detection means; and copy protection means for protecting a copy of the information recording medium based on determination results of the determination means.

According to a sixth aspect of the present invention, there is provided a copy-guard system comprising:

decoding means for decoding digital data, which is encoded and error-correction-coded, from an information recording medium in which key information encoded for the digital data is recorded;

encoded digital data acquisition means for acquiring digital data encoded by error-correcting the digital data decoded by the decoding means;

detection means for detecting an error position and an error symbol value of the encoded digital data acquired by the encoded digital data acquisition means;

compression means for compressing the key information encoded and stored in the information recording medium;

extraction means for extracting identification information, based on the key information compressed by the compression means and the error position and the error symbol value detected by the detection means;

determination means for determining whether a copy of the information recording medium is protected based on the identification information extracted by the extraction means; and copy protection means for protecting a copy of the information recording medium based on determination results of the determination means.

According to a seventh aspect of the present invention, there is provided a computer program product for operating a computer, the computer program product comprising:

a computer readable medium;

digital data encoded and error-correction coded, the digital data including identification information which is replaced with part of the digital data and recorded and which represents whether the computer readable medium is original or copied; and key information encoded for the digital data encoded and error-correction-coded, wherein each of the digital data and the encoded key information is recorded on the computer readable medium in executable form and loadable into the computer for execution by a processor.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Embodiments of the present invention will now be described with reference to the accompanying drawings.

In the embodiments, an information recording medium is a medium capable of recording/reproducing data, such as an MD and a DVD-RAM, and multimedia data such as an original image and voice is analog data.

First Embodiment

Figure 1:
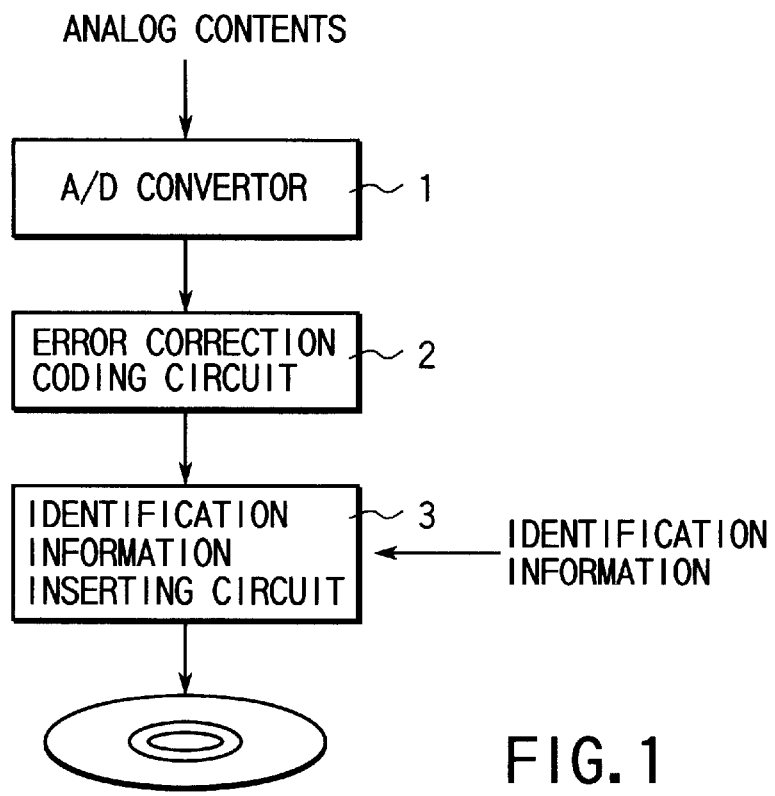
FIG. 1 is a block diagram illustrating a process of fabricating a disc used in a copy-guard system according to a first embodiment of the present invention.

FIG. 1 is a view showing a process of fabricating a disc used in a copy-guard system according to a first embodiment of the present invention.

The multimedia data being a analog data (analog contents) is digitized by an A/D converter 1 through sampling and quantization process and then error-correction-coded by an error-correction coding circuit 2 in order to correct an error of the data caused in its transmission path. Identification information, which indicates whether a disc (information recording medium) is original or not, is inserted into the error-correction-coded digital data by an identification information insertion circuit 3.

Figure 2:
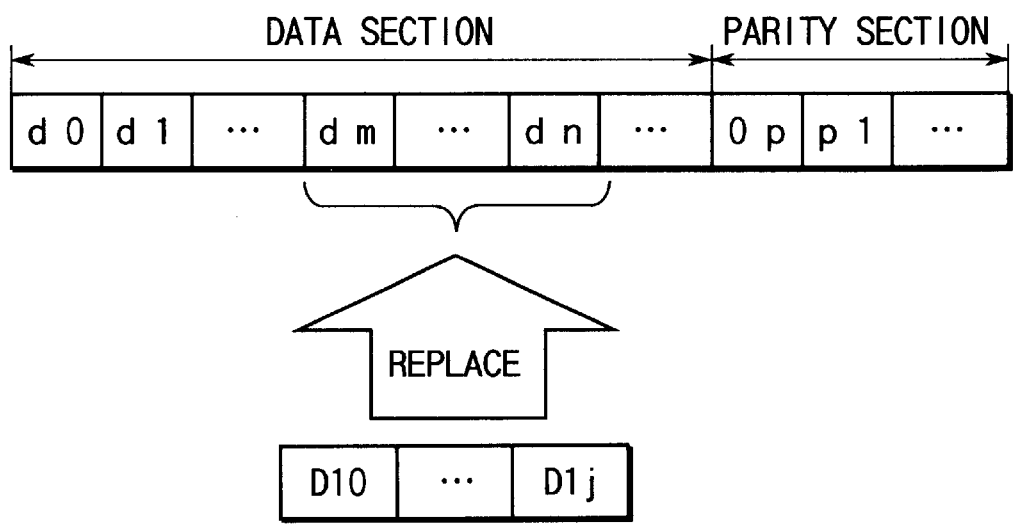
FIG. 2 is a view showing a method of inserting identification information.

As shown in FIG. 2, the identification information is inserted in the specific analog contents and then the analog contents are recorded on the information recording medium.

In FIG. 2, the m-th to n-th symbols in a data section are replaced with identification information items Dio to Dij, respectively.

In FIG. 2, a pattern of continuous symbols is replaced with the identification information. However, a specific symbol can be replaced with the identification information, or not continuous symbols but symbols having some spaces (for example, a space corresponding to one symbol) can be replaced therewith. Moreover, the symbols of not the data section but a parity section can be replaced. In this case, however, the number of symbols to be replaced should not be beyond the correction capacity and it is thus desirable to provide the capacity with a margin.

The reproduction of data from a disc in which a specific symbol of an error correction code has been replaced with identification information, will now be described.

Figure 3:
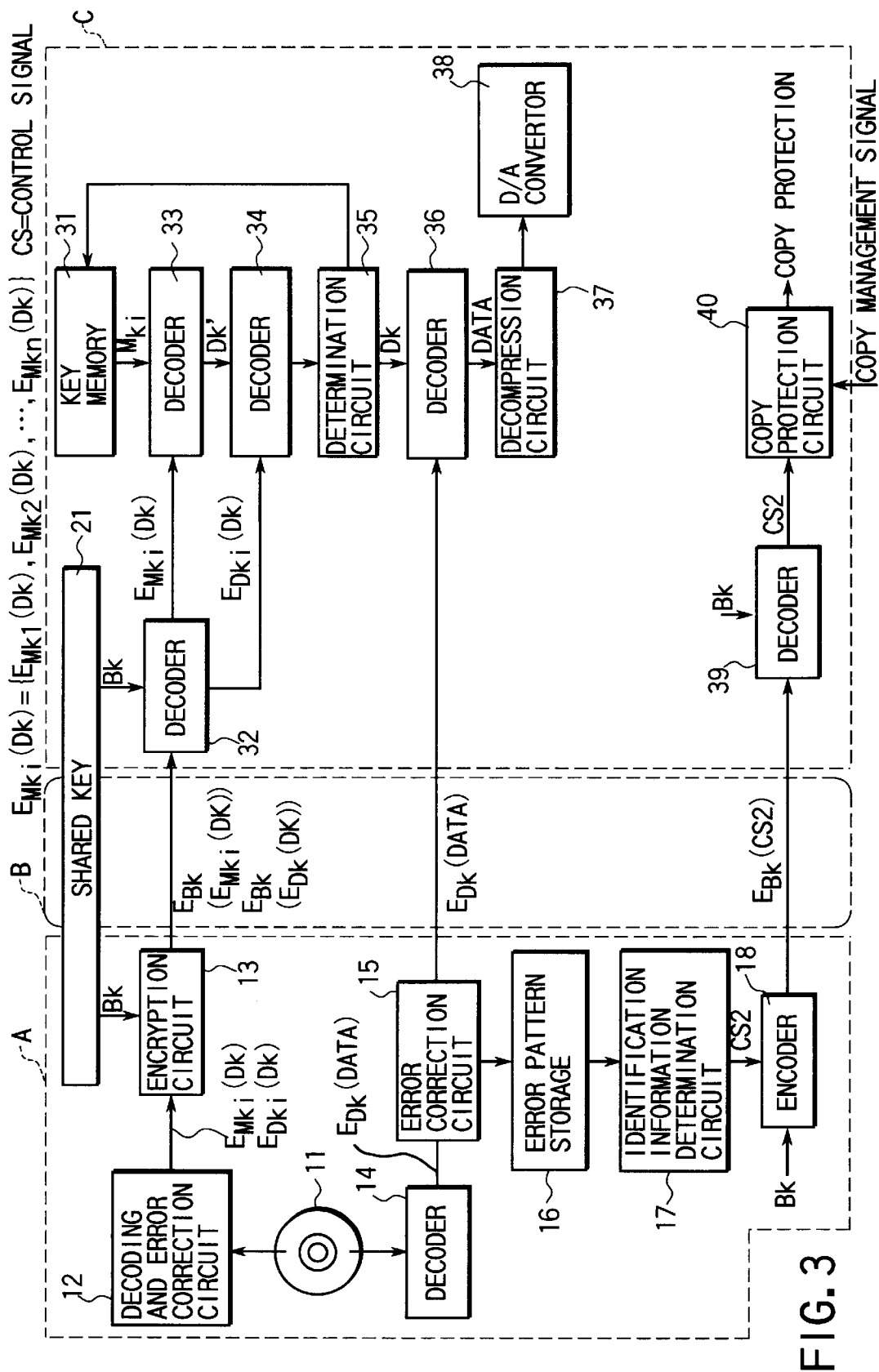
FIG. 3 is a block diagram of the copy-guard system according o the first embodiment of the present invention.

FIG. 3 is a block diagram of the copy-guard system according to the first embodiment of the present invention.

A copy-guard cryptographic technology has been already introduced into a DVD (Digital Video Disc, Digital Versatile Disc). This technology is described in detail in both Tatebayashi et al., "DVD Copyright Protection System," Technical Report of The Institute of Image Information and Television Engineers, May 22, 1997, pp. 15–19 and "DVD-Equipped Personal Computer," Nikkei Electronics, Aug. 18, 1997, No. 696, pp. 110–120. In the first embodiment, explanation of the protection system is omitted.

In the DVD described in the above report and magazine, the contents are protected using three different encoding keys. For simple explanation, two encoding keys are used in the first embodiment. Even though the type of encoding keys is only one or three or more, the first embodiment can be applied to the present invention.

In FIG. 3, reference sign A indicates a DVD disc drive, B shows a bus interface, and C represents a decoding unit such as an MPEG2 decoding unit used when a copy of an image is guarded.

The encoded key information items EMki(Dk) and EDk (Dk) are read from the DVD disc 11, and a decoding and error-correction circuit 12 decodes and error-corrects them. The encoded contents information item EDk(Data) other than the information items EMki(Dk) and EDk(Dk) is decoded by a decoder 14.

The encoded key information items EMki(Dk) and EDk (Dk) share a temporary encoding key Bk between the DVD disc drive A and decoding unit C in a key shared protocol 21. If the temporary encoding key Bk is shared, the key information items EMki(Dk) and EDk(Dk) are encoded by an encoder 13 using the temporary encoding key Bk, and these encoded key information items EBk(EMki(Dk)) and EBk (EDk(Dk)) are supplied to the decoding unit C.

In a decoder 32 of the decoding unit C, the key information items EBk(EMki(Dk)) and EBk(EDk(Dk)) are decoded using the shared temporary encoding key Bk, and n master keys Mki (i=1, ... , n) stored in a key memory 31 are called in sequence. The key information item EMki(Dk) is decoded by a decoder 33.

Using the information item Dk' obtained by the decoder 33 as a decoding key, the key information item EDk(Dk) is decoded by a decoder 34. Then, the result obtained by the decoder 34 is compared with the decoding key Dk' obtained by the decoder 33 in a determination circuit 35. If they coincide with each other, a master key is specified and an encoding key Dk encoding the data Dk can be obtained. If not, a new master key is read out of the key memory 31 in response to a control signal CS1, and the above procedure is repeated.

The encoded data EDk(Data) decoded by the decoder 14, is subjected to error correction in the error correction circuit 15 and transmitted to the decoding unit C. In the circuit 15, an error position and an error symbol value in digital data, which is encoded and error-correction-coded during the error correction, are extracted and stored in an error pattern storage 16. Based on the error position and error symbol value stored in the circuit 16, an identification information determination circuit 17 determines whether identification information is present in the information recording medium. This determination method will be described later together with other embodiments of the present invention.

A control signal CS2 indicative of the result obtained by the circuit 17, is encoded to a signal EBK(CS2) using the temporary encoding key Bk, which is shared in advance by an encoder 18, and transmitted to the decoding unit C. In a decoder 39 in the decoding unit C, the received signal EBK(CS2) is decoded using the key Bk as a decoding key to produce a control signal CS2.

A copy protection circuit 40 determines whether a copy can be made based on both the control signal CS2 output from the decoder 39 and, for example, the copy management signal in the CGMS. The copy cannot be made when the circuit 40 determines so.

If data is extracted using a technique such as tapping before a D/A converter 38 and recorded in a disc, the data includes no identification information since it passes through the error correction circuit. Thus, the copy protection circuit 40 prevents the data from being copied. In other words, the data extracted before the D/A converter 38 is changed to a symbol which has not been replaced with identification information. The identification information is not therefore located in a specific position, and the disc can be determined as a copied one.

The error-corrected, encoded data EDk(Data) is sent to the decoding unit C via a bus interface B. In the decoding unit C, a decoder 36 decodes the encoded data EDk(Data) using the encoding key Dk obtained by the determination circuit 35. The decoded data is decompressed by a decompression circuit 37, converted into analog data by the D/A converter 38, and reproduced by a speaker (not shown) through a display (not shown) and an amplifier.

Second Embodiment

The above first embodiment is directed to a normal error-correction code. However, almost all, the digital data currently used for multimedia is error-correction-coded using a double-coded error-correction code. Hereinafter, double-coded error correction will be described.

Figure 4:
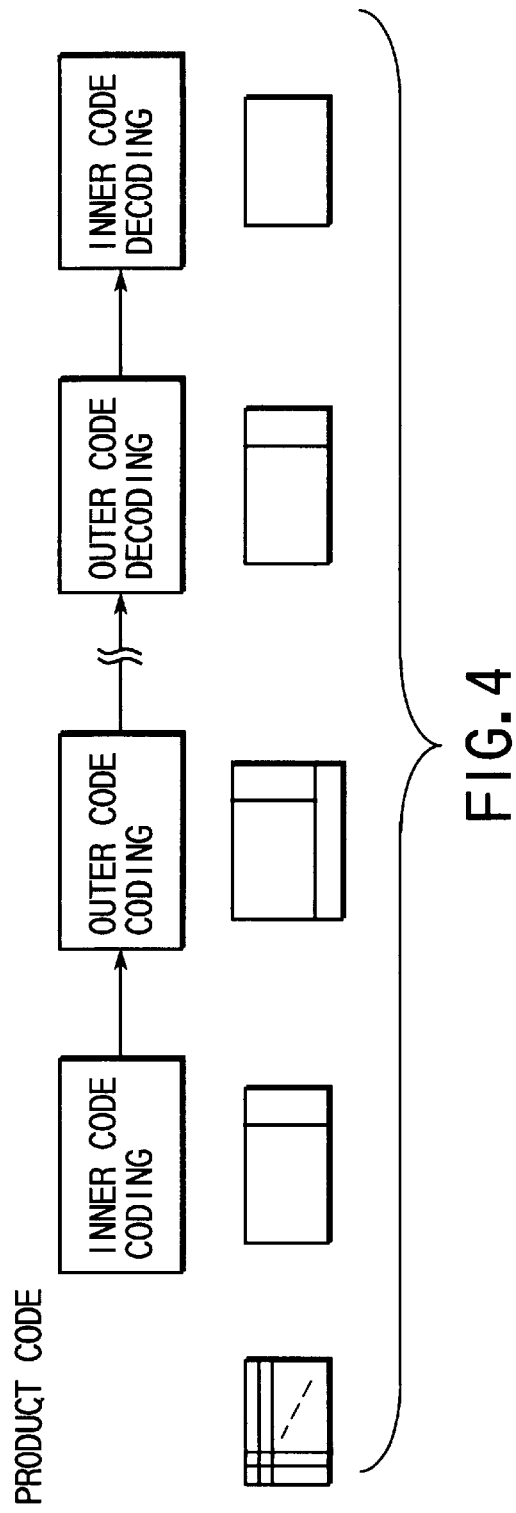
FIG. 4 is a block diagram showing a general process of encoding and decoding a product code.

FIG. 4 illustrates a general flow of encoding and decoding a product code.

The product code is constituted by arranging symbols two-dimensionally. Referring to FIG. 4, the symbols are first error-correction-coded in the row direction to obtain an inner code and then done in the column direction to obtain an outer code. The product code of the inner and outer codes is transmitted. After that, the outer code is decoded and then the inner code is decoded. If it is determined that an error cannot be corrected when the outer code is decoded, a bit called a flag is set to each of symbols of the outer code to indicate the presence of the error. If the error is corrected by considering that the symbols to which the flags are set are lost when the inner code is decoded, a correction ability can be increased. This is loss correction.

Figure 5:
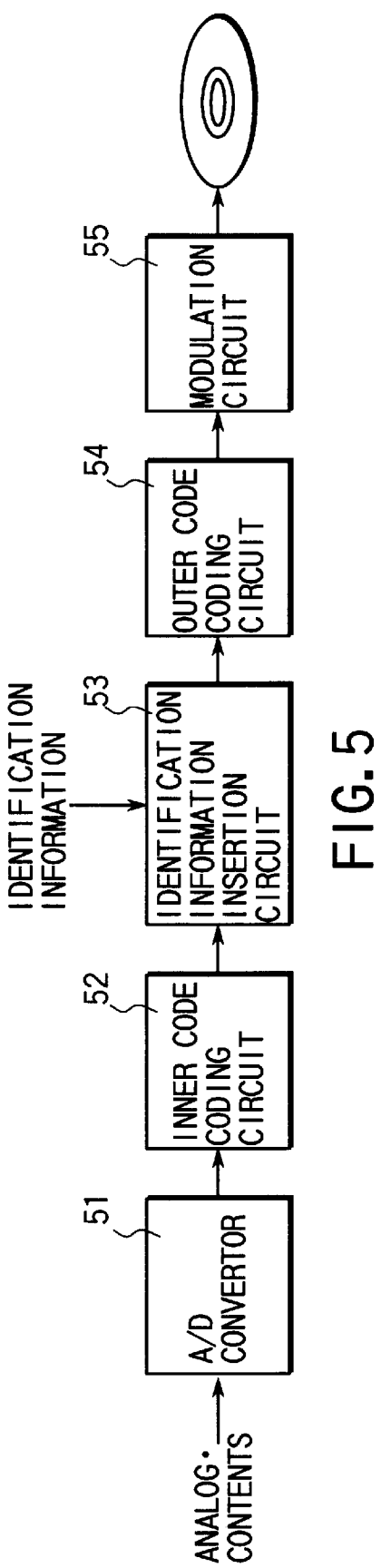
FIG. 5 is a block diagram showing a process of fabricating an information recording medium using a product code.

FIG. 5 illustrates a process of fabricating an information recording medium using a product code.

Similarly to the above, the analog contents are converted into digital information by an A/D converter 51, and the digital information is error-correction-coded in an inner code coding circuit 52. Identification information is replaced with a predetermined symbol of digital data, according to rule, in an identification information insertion circuit 53. The symbol is then error-correction-coded by an inner code, and the digital data including the identification information is coded by an outer code coding circuit 54. The coded data is modulated by a modulation circuit 55 and recorded in the information recording medium. A method of inserting identification information into digital data will be described later.

Figure 6:
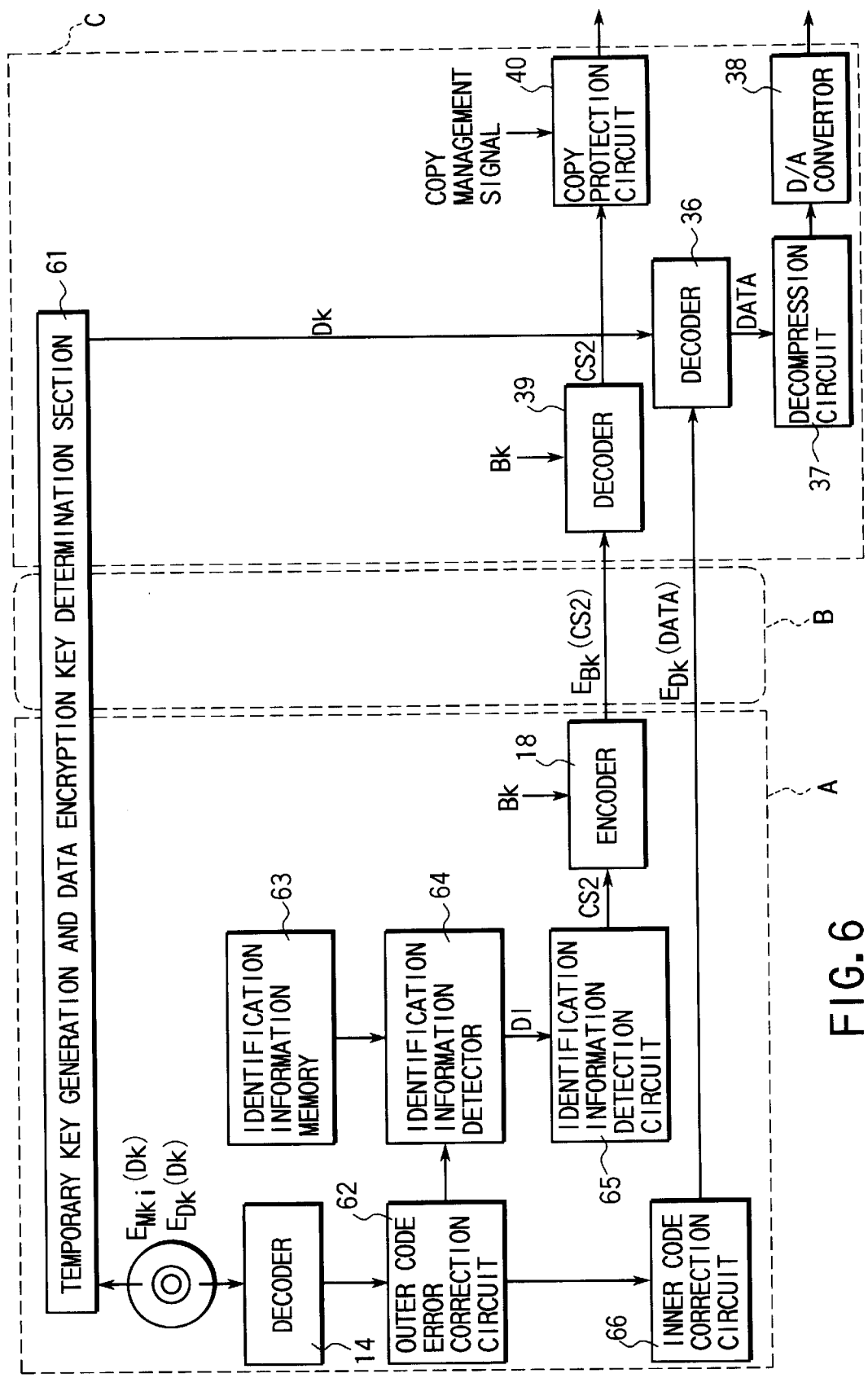
FIG. 6 is a block diagram of a copy-guard system according to a second embodiment of the present invention.

FIG. 6 is a block diagram of a copy-guard system according to a second embodiment of the present invention. The same constituting elements in FIG. 6 as those in FIG. 3 are indicated by the same reference numerals and their descriptions are omitted.

In FIG. 6, a temporary key & data encoding key determination section 61 is equivalent to one section including the decoding and error-correction circuit 12, encoder 13, key shared protocol 21, key memory 31, decoders 32–34, and determination circuit 35.

The encoded key information items EMki(Dk) and EDk (Dk) are read out from a DVD disc 11. As in the case of FIG. 3, the temporary key & data encoding key determination section 61 generates a temporary key Bk and determines a data encoding key Dk.

A decoder 14 decodes the encoded data Edk(Data) recorded on the DVD disc 11 and then an outer code error correction circuit 62 error-corrects the outer code of the data EDk. An identification information detector 64 compares the error-corrected data with a pattern of identification information recorded in an identification information memory 63 to extract identification information DI. An identification information determination circuit 65 determines whether the data is original or copied and outputs, a control signal CS2. The control signal CS2 is encoded by an encoder 18 using the temporary key Bk as an encoding key. The encoded signal EBk(CS2) is supplied to a decoding unit C. The supplied EBk(CS2) is decoded by a decoder 39 using a temporary key as a decoding key to obtain a control signal CS2. A copy protection circuit 40 determines whether a copy can be made based on both the control signal CS2 and a copy management signal. The copy cannot be made when the circuit 40 determines so.

After the identification information is extracted from the encoded data which has undergone the outer code error correction by the circuit 62, a flag is set in the symbol of the encoded data. This flag is lost by inner code error correction process in an inner code error correction circuit 66.

The error-corrected, encoded data is sent to the decoding unit C and decoded by a decoder 36. The decoded data is decompressed by a decompression circuit 37, converted into analog data by a D/A converter 38, and reproduced by a speaker (not shown) through a display (not shown) and an amplifier.

If data is extracted using a technique such as tapping before the D/A converter and recorded in a disc, the disc includes no identification information since the data passes through the error correction circuits 62 and 66. Thus, the copy protection circuit 40 prevents the data from being copied. In other words, the data extracted before the D/A converter should be changed to a symbol which has not been replaced with identification information. The identification information is not present in a specific position, and the disc can be determined as a copied one.

Third Embodiment

The above second embodiment has a problem that the reliability of error-correction codes is low and, in other words, the probability that an error is corrected erroneously or cannot be corrected is high since the embodiment is directed to a method of extracting identification information by decoding an outer code. The second embodiment also has a problem that the probability of erroneous detection of identification information is high when an error is corrected erroneously or cannot be corrected, since identification information is compared with a pattern of the identification information previously recorded in a memory to extract the identification information.

A third embodiment using a product code to overcome the above problems of the second embodiment, will now be described.

Figure 7:
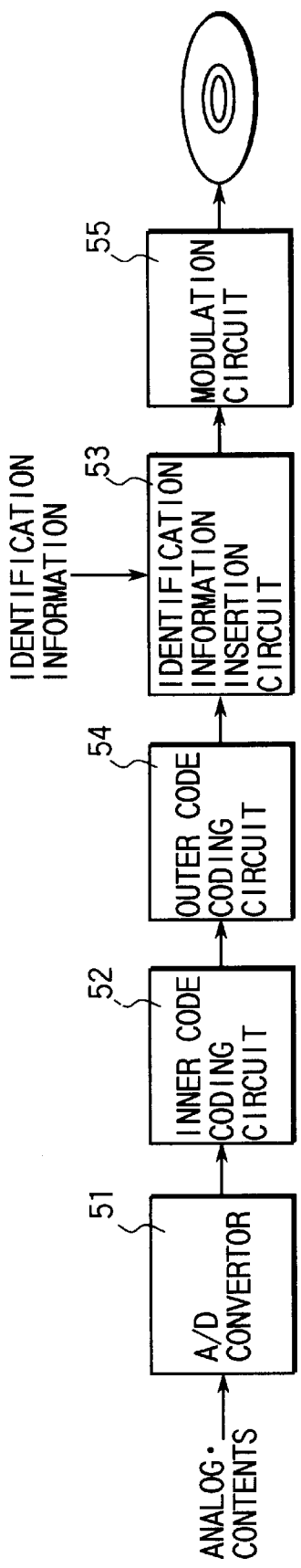
FIG. 7 is a block diagram illustrating a method of fabricating an information recording medium used in a copy-guard system according to a third embodiment of the present invention.

The process of fabricating an information recording medium using a product code, is illustrated in FIG. 7. It is in the position of identification information insertion circuit 53 that FIG. 7 differs from FIG. 5.

The analog contents are converted into digital information by an A/D converter 51. The digital information is error-correction-coded by an inner code coding circuit 52 and then coded by an outer code coding circuit 54. Then, identification information is inserted in the digital information by the identification information insertion circuit 53 according to rule, then modulated by a modulation circuit 55, and recorded in the information recording medium. A method of inserting identification information in digital information will be described later.

A copy-guard system for reproducing data from a DVD disc manufactured by the method of FIG. 7, will now be described.

Figure 8:
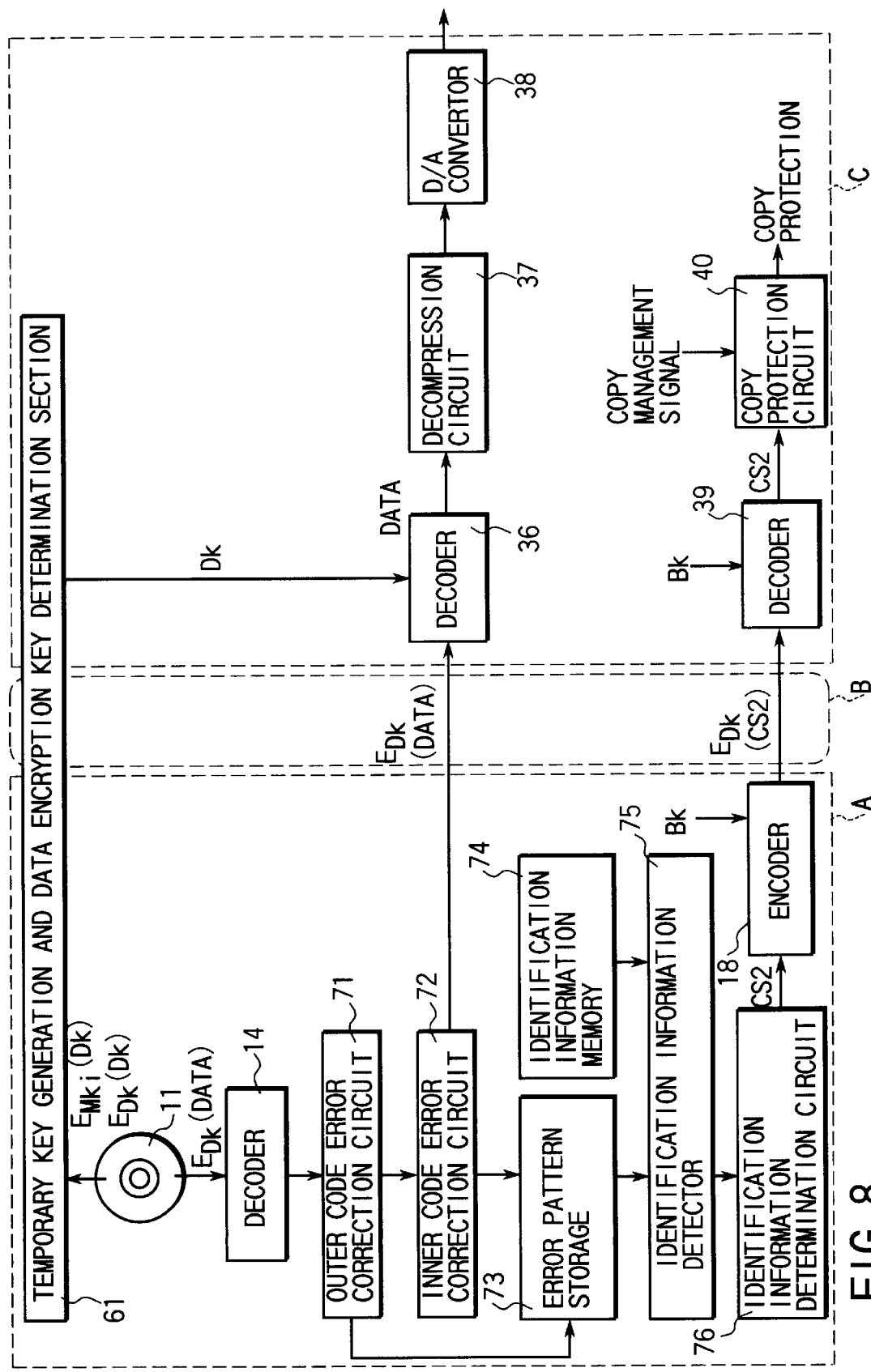
FIG. 8 is a block diagram of the copy-guard system according to the third embodiment of the present invention.

FIG. 8 is a block diagram of a copy-guard system according to the third embodiment of the present invention. The same constituting elements in FIG. 8 as those in FIG. 6 are indicated by the same reference numerals, and their descriptions are omitted.

The encoded key information items EMki(Dk) and EDk(Dk) are read from a DVD disc 11. A temporary key & data encoding key determination section 61 generates a temporary key Bk and determines a data encoding key Dk. Therefore, the temporary key Bk and data encoding key Dk is obtained.

The encoded data EDk recorded on the DVD disc 11 is decoded by a decoder 14 and then subjected to outer code error correction by an outer code error correction circuit 71. The circuit 71 supplies a pattern storage 73 with both error position information obtained by the outer code error correction and an error symbol value which has not been corrected.

The digital data, which has undergone the outer code error correction, is inner-code-error-corrected by an inner code error correction circuit 72 and, as in the outer code error correction, the circuit 72 supplies the pattern storage 73 with both error position information obtained by the inner code error correction and an error symbol value which has not been corrected.

Based on the above error position information, error symbol values, and the identification information stored in an identification information memory 74, an identification information detector 75 detects identification information and then an identification information determination circuit 76 determines whether identification information is present or not and outputs a control signal CS2 indicative of the determination result. A method of this determination will be described later.

The control signal CS2 is encoded by an encoder 18 using the temporary key Bk as an encoding key and supplied to a decoding unit C. The encoded control signal EDK(CS2) is decoded by a decoder 39 to extract a control signal CS2 and supply it to a copy protection circuit 40.

The error-corrected, encoded data EDk (Data) is sent to the decoding unit C and decoded by a decoder 36 using the encoding key Dk generated by the temporary key & data encoding key determination section 61. The decoded data is decompressed by a decompression circuit 812, converted into analog data by a D/A converter 38, and reproduced through a display (not shown) or a speaker (not shown).

If data is extracted using a technique such as tapping before the D/A converter 38 and recorded on a disc, the disc includes no identification information since the data passes through the error correction circuits. In other words, the identification information should be changed to a symbol which has not been replaced with identification information. Therefore, identification information is not located in as a specific position and the disc can be determined as a copied one.

A copy protection circuit 40 determines whether a copy can be made based on both the control signal CS2 and a copy management signal (not shown). The copy cannot be made when the circuit 40 determines so.

Fourth Embodiment

The third embodiment is directed to a copy-guard system in which identification information is extracted after error correction, whereas the fourth embodiment is directed to a copy-guard system in which identification information is extracted before the error correction.

Figure 9:
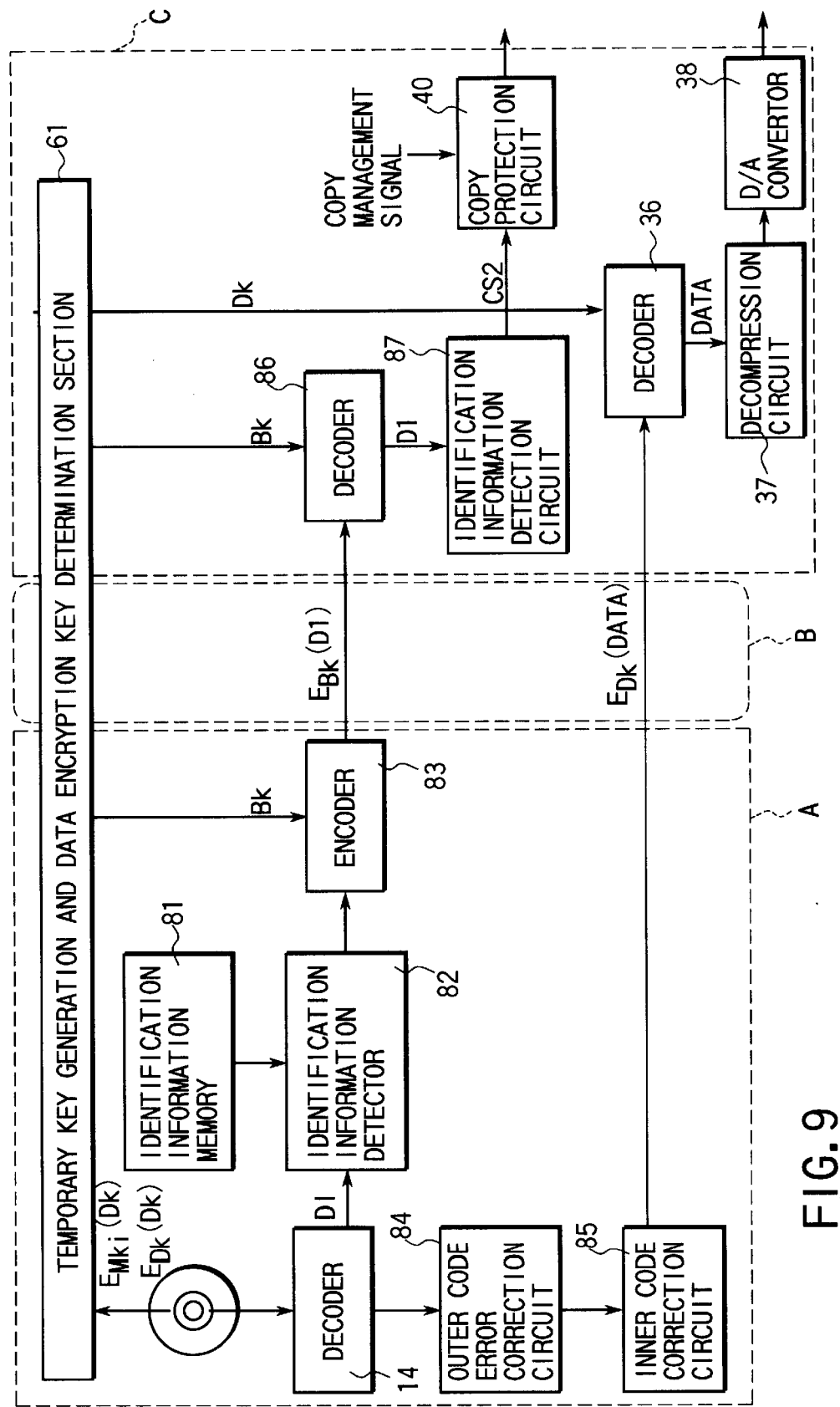
FIG. 9 is a block diagram of a copy-guard system according to a fourth embodiment of the present invention.

FIG. 9 is a block diagram of a copy-guard system according to a fourth embodiment of the present invention. The same constituting elements in FIG. 9 as those in FIG. 8 are indicated by the same reference numerals, and their descriptions are omitted.

A DVD disc 11 reads key information items EMki(Dk) and EDk(Dk). A temporary key & data encoding key determination section 61 generates a temporary key Bk and determines a data encoding key Dk.

A decoder 14 decodes the encoded data EDk recorded on the DVD disc 11, and an identification information detector 82 compares a pattern of the decoded data with identification information recorded in an identification information memory 81 in units of product code block. If the circuit 82 detects identification information DI, an encoder 83 endodes it using a temporary key Bk. The encoded information is then supplied to a decoding unit C.

A decoder 86 of the decoding unit C decodes the identification information DI encoded in the encoder 83, using the temporary key Bk as a decoding key, and sends it to an identification information determination circuit 87. The circuit 87 determines whether the disc is original or copied based on the identification information DI and outputs a control signal CS2 indicative of the determination result. A method of this determination will be described later.

A copy protection circuit 40 determines whether a copy can be made based on both the control signal CS2 and a copy management signal. The copy cannot be made when the circuit 40 determines so. Since, the identification information is encoded and transmitted to the decoding unit C and then determined on the decoding unit side, a disc drive manufacturer can conceal how a control signal is output from identification information.

The decoded data EDk(Data) is subjected to error code correction by an outer code error correction circuit 84 and an inner code error correction circuit 85 and then transmitted to the decoding unit C. The transmitted data EDk(Data) is decoded by a decoder 36 using an encoding key Dk. The decoded data is decompressed by a decompression circuit 37, converted into analog data by a D/A converter 38, and reproduced through a display (not shown) or a speaker (not shown).

If data is extracted using a technique such as tapping before the D/A converter 38 and recorded on a disc, the disc includes no identification information since the data passes through the error correction circuits 84 and 85. In other words, the identification information should be changed to a symbol which has not been replaced with identification information. Therefore, identification information is not located in a specific position, and the disc can be determined as a copied one.

(Method of Inserting Identification Information into Product code)

A method of inserting identification information into a product code will now be described. The number of identification information items can be constituted of one or plural symbols. If there are plural symbols, they can be varied from one another as determined in advance.

First the simplest method of inserting identification information into a specific position of a product code, will be described.

In FIG. 5, the number of identification information symbols is one; however, it can be plural. As has been described, a specific symbol has only to be chosen from among a plurality of identification information symbols stored in a memory.

Figure 10:
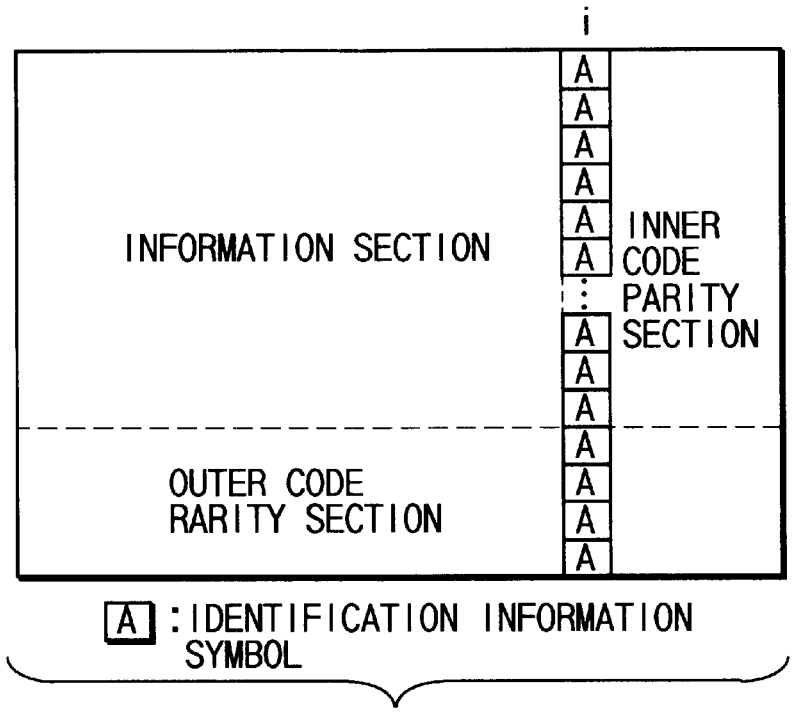
FIG. 10 is a view showing a method of inserting identification information.

In the product code of shown in FIG. 10, it is turned out in advance that all symbols of the i-th column are identification information; therefore, the symbols of the i-th column are not decoded but only the flags can be set thereto when the outer code is decoded. In this case, the symbols of the i-th column are all regarded as lost symbols when the inner code is decoded.

All symbols of a specific row can be set to identification information. Since, in this case, an error is corrected by the outer code, the stored error position and error symbol information are compared with the identification information stored in the memory, as in the copy-guard system of FIG. 8, or a pattern of the decoded data is compared with the identification information in units of product code block before an error is corrected, as in the system of FIG. 9.

The identification information need not be always restricted to symbols of the i-th column, but can be set to those of an arbitrary row or column. Thus, a method of inserting identification information in the symbols of an arbitrary row or column will now be described.

Figure 11:
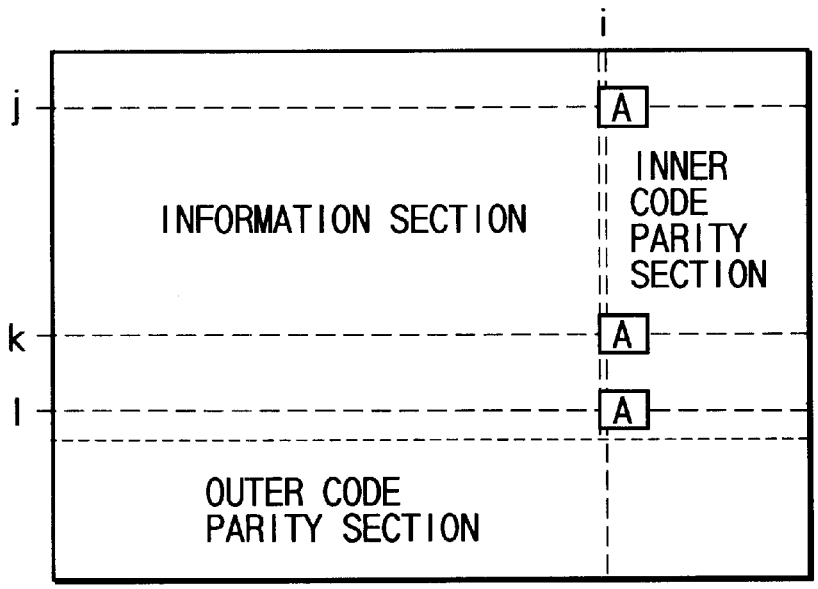
FIG. 11 is a view showing a method of inserting identification information.

If, as shown in FIG. 11, an error can be corrected when the number of symbols is smaller than the ability of the outer code to correct an error, for example when the number is five or more, identification information is inserted into the j-th, k-th and l-th rows of the i-th column (three symbols are inserted into the product code block).

It can be determined whether a disc is original or copied by determining the detected identification information. This identification information determination will be described later.

In the copy-guard system shown in FIG. 6, an error caused in identification information can be corrected by decoding an outer code, thereby reducing in cases where no identification information can be obtained. However, the outer code has to be coded after identification information is inserted only into the information section thereof.

Since, in the above two methods, identification information is inserted into a specific position, an unauthorized copy is likely to be made when information of the position leaks out. Then, a method of varying a position in which identification information is inserted, will be described.

Figure 12:
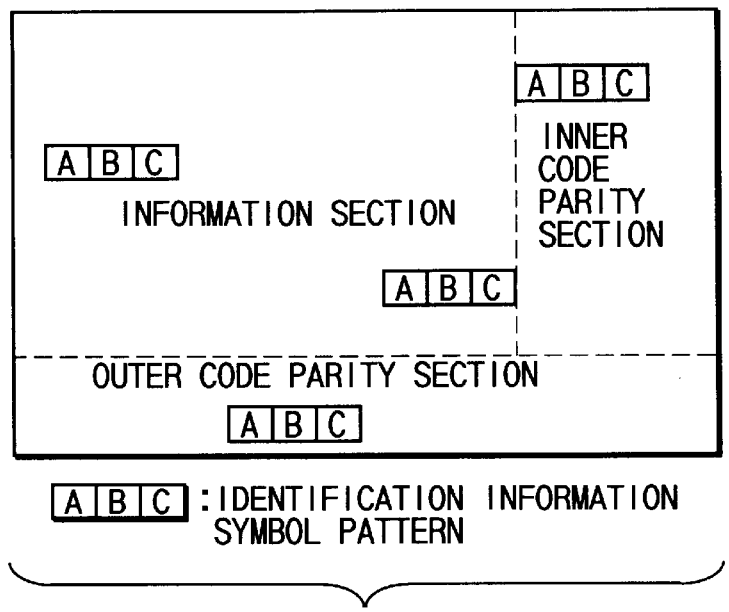
FIG. 12 is a view showing a method of inserting identification information.

When a pattern of plural symbols is identification information as shown in FIG. 12, a fixed number of symbol patterns are inserted in each of product code blocks. If the number of symbol patterns obtained in each block when identification information is extracted, is not less than a threshold value, it can be determined that a disc is original.

A method of inserting identification information using a plurality of symbol patterns, will be described.

Figure 13:
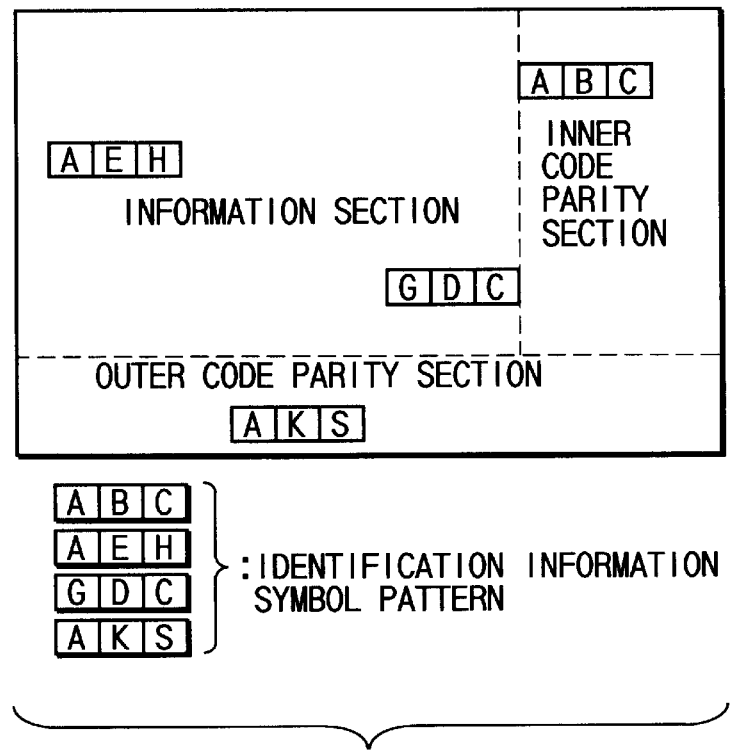
FIG. 13 is a view showing a method of inserting identification information.

As illustrated in FIG. 13, a plurality of symbol patterns are inserted in the product code blocks and compared with previously-registered identification information symbol patterns when identification information is detected. Different symbol patterns can be used and so can be a pattern of the same n (e.g., n=5) symbols. When the n symbols appear continuously, it can be determined that an identification signal is detected.

The identification signal can be detected before error correction (method of FIG. 9) or before inner code error correction (method of FIG. 6). However, the method of FIG. 8 wherein error position information is correct because the identification information inserting position is varied, or a method for detecting an identification signal based on both error position information and error symbol information is favorable.

The symbols serving as identification information need to be inserted in different positions of the product code so as to prevent them from overlapping.

(Determination Method Using Identification Information)

Figure 14:
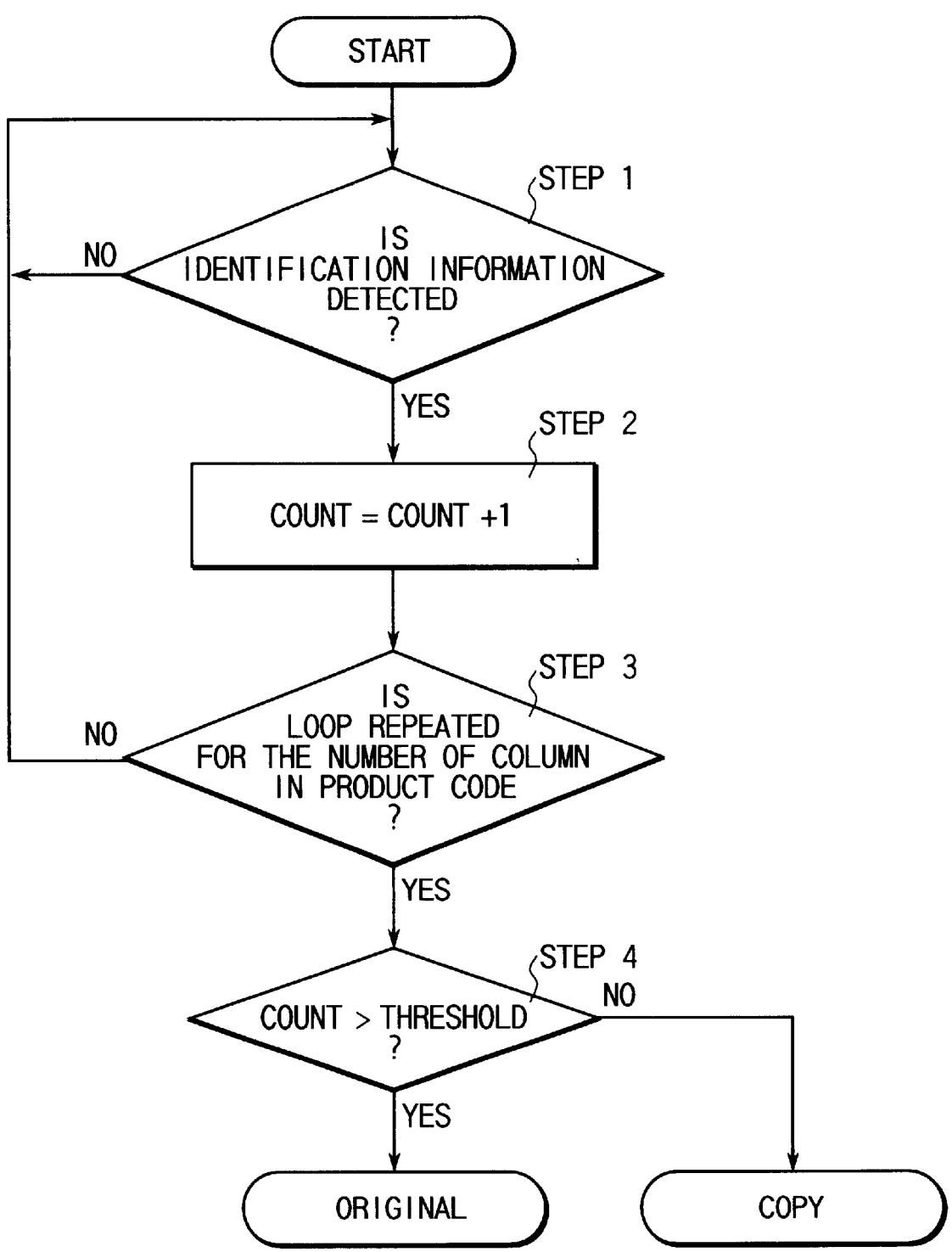
FIG. 14 is a flowchart showing a process of determining whether a disc is original or copied using identification information.

FIG. 14 is a flowchart showing a method of determining whether a disc is original or copied using identification information.

Count the number of detected identification information items which are registered in units of product code (steps 1 to 3). If the counted number is compared with a preset threshold value (step 4), it can be determined whether a disc is original or copied. This method is executed by checking a symbol pattern.

A method of determining whether a disc is original or copied using only the positional information of identification information, will now be described.

Figure 15:
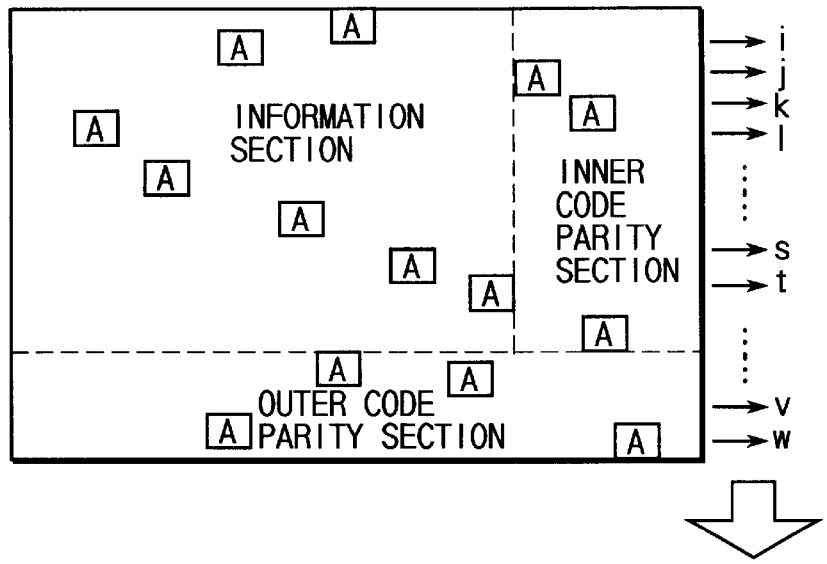
FIG. 15 is a view showing a method of determining whether a disc is original or copied using identification information.

As illustrated in FIG. 15, a specific symbol pattern is inserted in each row. When identification information is extracted, each row is checked to detect where a symbol of the identification information is positioned. The detected positional information items are input to a unidirectional function (g) as parameters. The unidirectional function (g) produces different outputs in response to different input parameters. If, therefore, a plurality of positional information items of the inserted identification information are compared with output results r of the unidirectional function obtained from the positional information, it can be determined whether a disc is original or copied.

Figure 16:
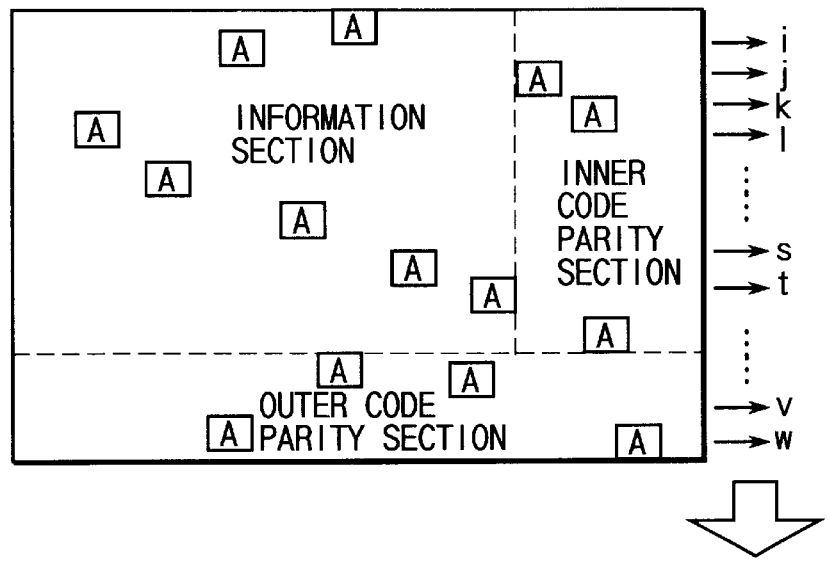
FIG. 16 is a view showing a method of determining whether a disc is original or copied using identification invention.

Another determination method using identification information will be described with reference to FIG. 16.

The above determination method requires a memory and needs checking the results of the unidirectional function. Therefore, identification information is predetermined, and one symbol is inserted in each row. When the identification information is extracted, its positional information is input to a predetermined function $g_0$ as a parameter. The output r of the function $g_0$ is input to a unidirectional function $H_0$. If r indicates a certain value or specific positional information is set to a parameter, all outputs of the function $H_0$ are set to have the same value c. By doing so, it can be determined whether a disc is original or copied according to whether the output of the function $H_0$ is c or not. Consequently, this method requires no memory and shortens processing time.

Fifth Embodiment

According to the above first to fourth embodiments, it is difficult to determine whether positional information of identification information is fixed or not and whether the position of identification information coincides with the very symbol position thereof even though the positional information is varied, and a statistical operation such as an operation of counting the number of identification information items is employed.

Then, a method of preventing an unauthorized copy using an electronic watermark technique which is currently noted as a copyright protection technique, will be described.

Figure 17:
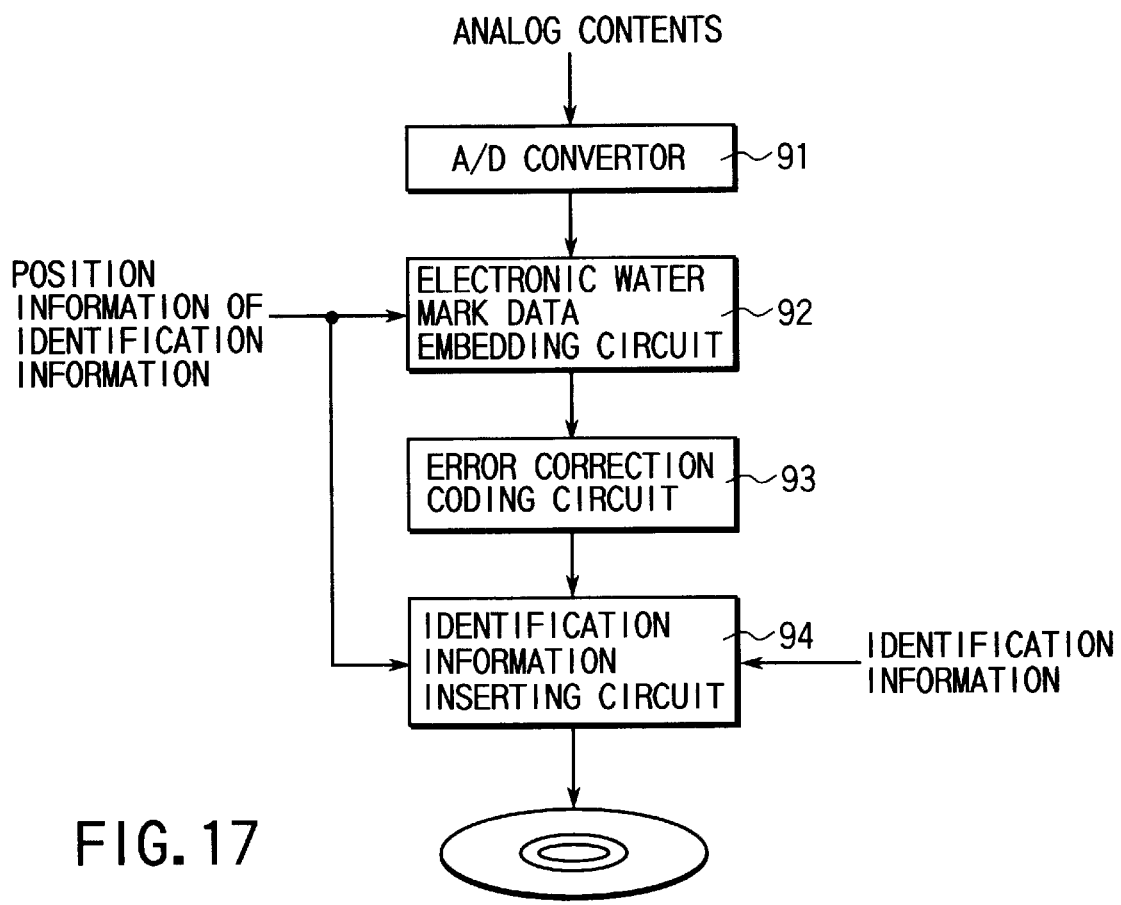
FIG. 17 is a block diagram illustrating a process of fabricating an information recording medium used in a copy-guard system according to a fifth embodiment of the present invention.

FIG. 17 is a block diagram illustrating a process of fabricating an information recording medium used in a copy-guard system according to a fifth embodiment of the present invention.

In the fifth embodiment, positional information for inserting identification information is embedded in the contents as an electronic watermark. The feature of the electronic watermark is that the information is hard to remove and extract.

The analog contents are converted to digital information in an A/D conversion circuit 91. Positional information of identification information is embedded in the contents in an electronic watermark information embedding circuit 92. In most cases, a watermark information embedding circuit is incorporated into an A/D conversion circuit since watermark information is embedded when data is quantized. In FIG. 17, these circuits are separated from each other for easy understanding.

The contents in which the positional information is embedded, are error-correction-coded in an error-correction coding circuit 93, and the identification information is replaced with some of the contents in an identification information insertion circuit 94 in accordance with the positional information. The contents are thus recorded in an information recording medium.

According to the above method, the identification information is changed as occasion demands, and the positional information is recorded using the electronic watermark technique. It is thus difficult to specify a symbol position in which identification information is embedded illegally.

Figure 18:
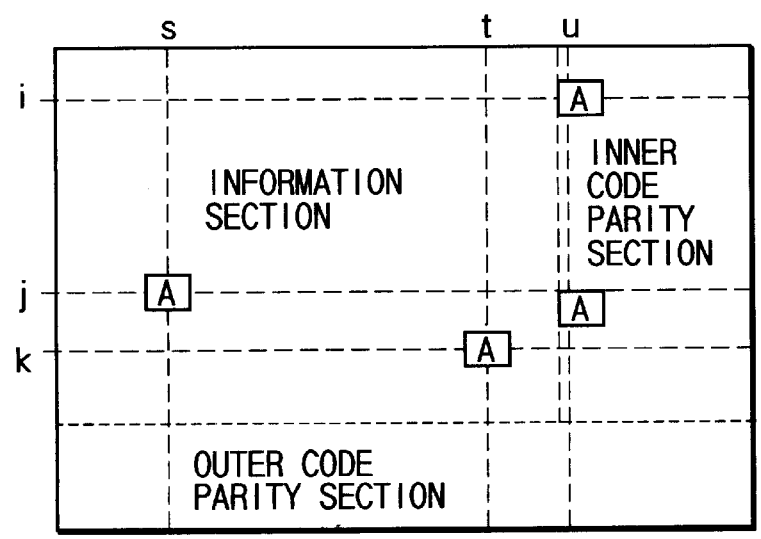
FIG. 18 is a view showing a method of inserting identification information.

For example, as illustrated in FIG. 18, identification information is embedded in a symbol of row i and column u, that of row j and column s, and that of row k and column t according to the positional information for the identification information. In some cases, the identification information is embedded only in a data section or a parity section. However, it is necessary to prevent the identification information from being inserted in the same symbol position.

The reproduction of an information recording medium when identification information is varied in position, will now be described.

Figure 19:
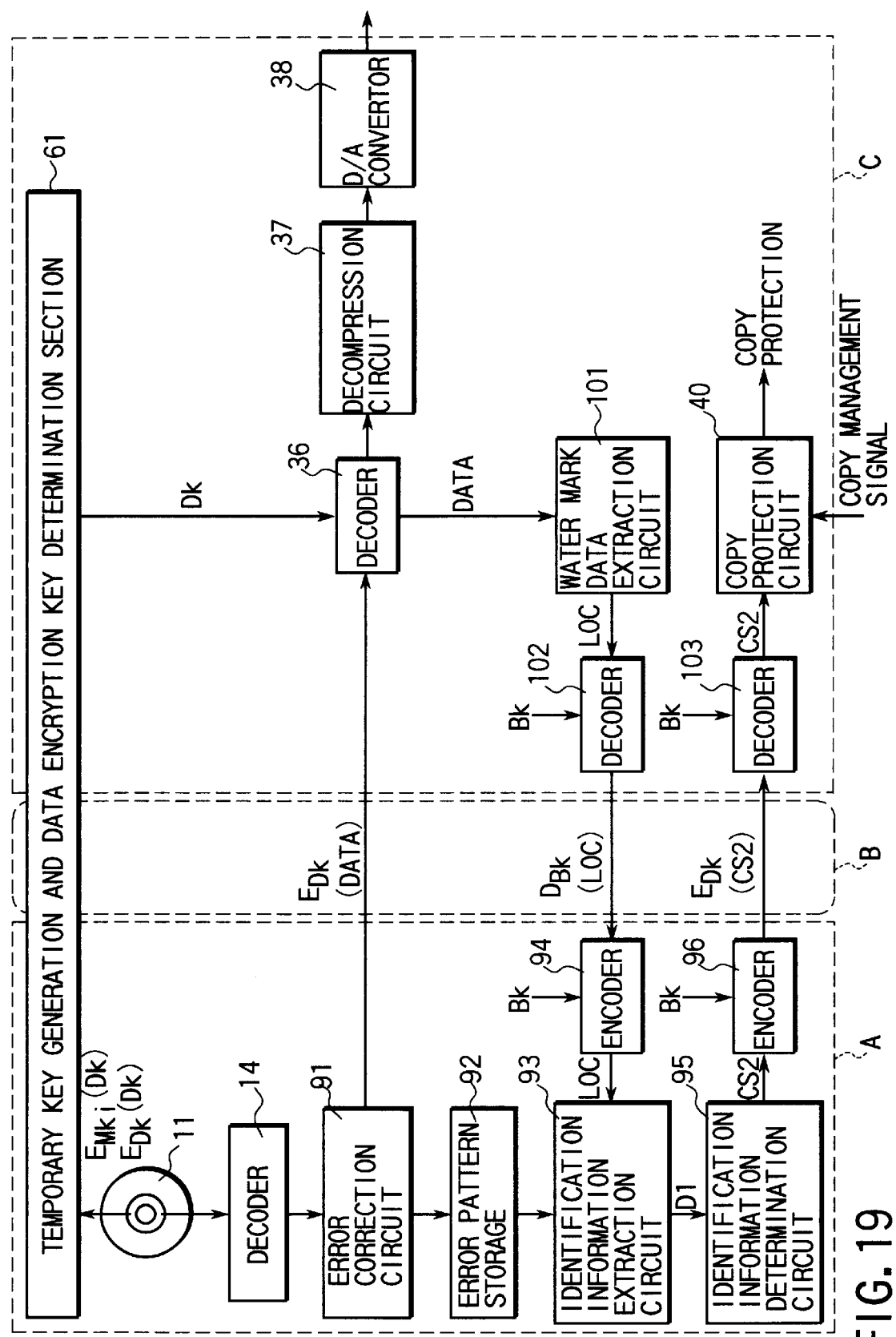
FIG. 19 is a block diagram of the copy-guard system according to the fifth embodiment of the present invention.

FIG. 19 is a block diagram of a copy-guard system according to the fifth embodiment of the present invention. The same constituting elements in FIG. 19 as those in FIG. 9 are indicated by the same reference numerals and their descriptions are omitted.

A DVD disc 11 reads encoded key information items EMki(Dk) and EDk(Dk). As in the foregoing embodiments, a temporary key & data encoding key determination section 61 generates a temporary key Bk and determines a data encoding key Dk.

A decoder 14 decodes the encoded data EDk(Data), and an error correction circuit 91 corrects an error of the decoded data. In the fifth embodiment, both inner and outer codes are error-correct-coded by the circuit 91.

An error pattern is formed from error positional information and error symbol values obtained during the error correction of the encoded data EDk(Data), and stored in an error pattern storage 92.

The error-corrected encoded data EDk(Data) is transmitted to a decoding unit C through a bus interface B. The transmitted data EDk(Data) is decoded by a decoder 36 using the data encoding key Dk obtained by the section 61. Embedding positional information of identification information is embedded in the data decoded by the decoder 36 as watermark information. The decoded data is input to an electronic watermark information extraction circuit 101 to extract positional information of the identification information. The extracted positional information loc is decoded by a decoder 102 using the temporary key Bk as a decoding key and then transmitted to a disc drive A.

In the disc drive A, the positional information loc is encoded by an encoder 94 using the temporary key Bk as an encoding key and then extracted. Thus, identification information DI is extracted by an identification information extraction circuit 93 based on the error pattern recorded in the error pattern storage 92 and the positional information loc of the identification information. Based on the identification information DI, an identification information determination circuit 95 determines whether a disc is original or copied and outputs a control signal CS2 indicative of the determination results.

The control signal CS2 is encoded by an encoder 96 using the temporary key Bk as an encoding key and then supplied to the decoding unit C. In the unit C, a decoder 103 decodes the encoded signal using the temporary key Bk as a decoding key to obtain a control signal CS2.

If data is extracted using a technique such as tapping before a D/A converter and recorded on a disc, the disc includes no identification information since the data passes through the error correction circuit 91. In other words, the identification information should be changed to a symbol which has not been replaced with identification information. Therefore, identification information is not present in a specific position and it can be determined that the disc is copied.

The identification information determination circuit 95 determines whether a disc is original or copied and outputs a control signal CS2 representing that the disc can be copied or not. Using the control signal CS2, a copy protection circuit 40 determines whether a copy can be made or not based on both the original disc and a copy management signal. The copy cannot be made when the circuit 40 determines so.

The data decoded by the decoder 36 is decompressed by a decompression circuit 37, converted into analog data by the D/A converter 38, and reproduced through a display (not shown) or a speaker (not shown).

By using the watermark information, the positional information of identification information can be varied and the identification information can be embedded in a product code in secrecy.

(Method of Transmitting Control Signal in Safety)

Since the control signal CS2 is a signal indicating whether a disc is original or copied, at least one bit is sufficient therefor. For example, bit "0" represents the copied disc and bit "1" indicates the original one, and vice versa. When such a small bit is encoded, it will be easily decoded even though the original data (plaintext in encryption technology) is encoded by a long key. Consequently, even though data on a bus is encoded by a temporary key, it is likely to be decoded.

A method of transmitting a control signal CS2 in safety will now be described with reference to FIG. 20.

Figure 20:
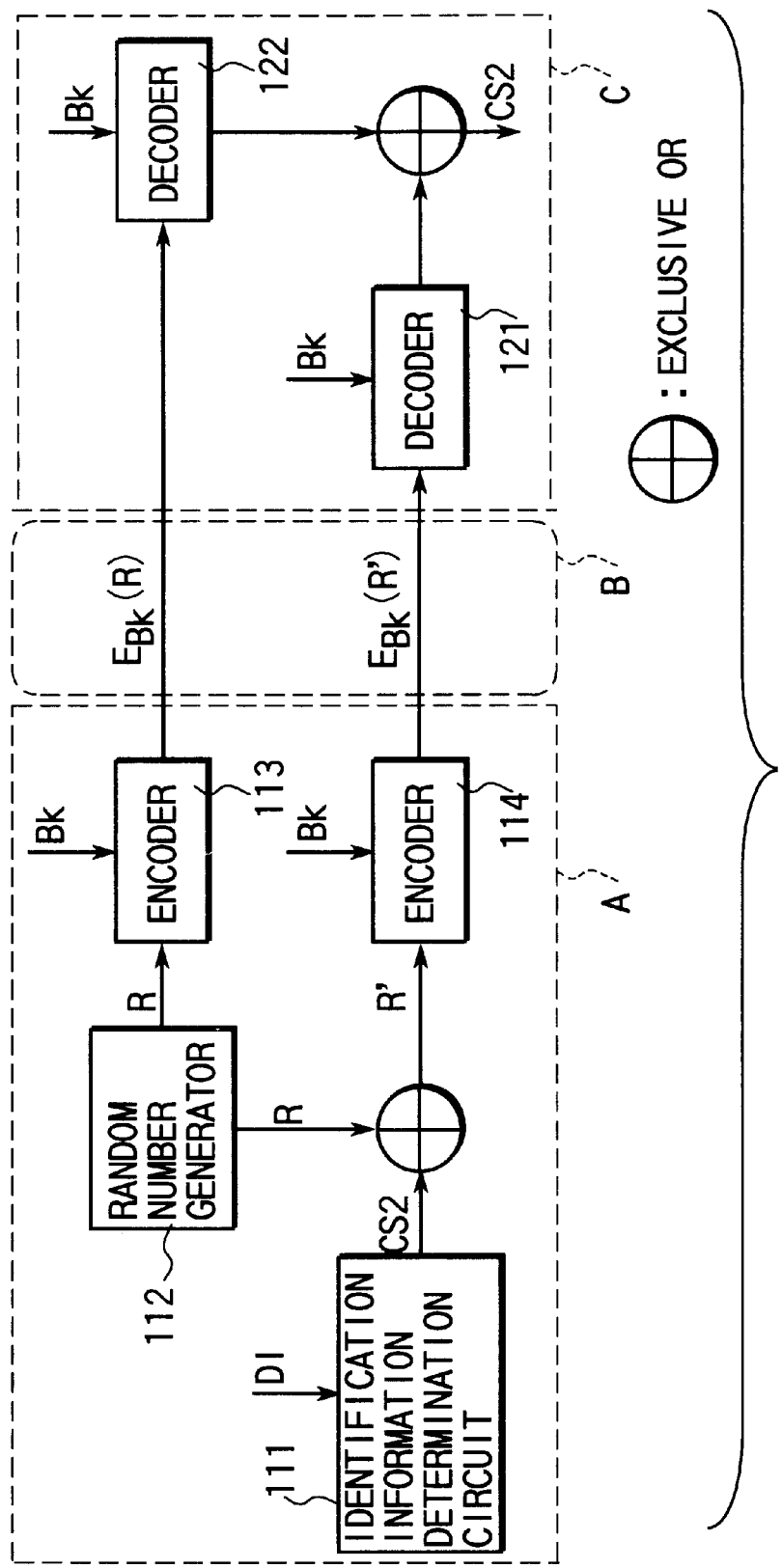
FIG. 20 is a block diagram showing a method of transmitting a control signal in safety.

In FIG. 20, reference symbol A indicates a disc drive, B denotes a bus interface, and C represents a decoding unit. Only the elements necessary for describing the control signal transmitting method are shown.

Assume that the identification information DI is extracted in the embodiment described so far. This information DI is determined by an identification information determination circuit 111, and a control signal CS2 indicative of the determination result is output.

A random number R is generated by a random number generator 112 and EXCLUSIVE Ored with the control signal CS2. The random number R is encoded by a temporary key Bk in an encoder 115, and the encoded random number EBK(R) is transmitted to a decoder 122 in the decoding unit C. Similarly, an exclusive OR (R') of the random number R and control signal CS2 is encoded by the temporary key Bk in an encoder 114, and the encoded exclusive OR (R') is supplied to a decoder 121 of the decoding unit C.

The encoded random number EBK(R) is decoded by the temporary key Bk in the decoder 122 of the decoding unit C, and a result EBK(R') of the encoded exclusive OR is decoded by the temporary key Bk in the decoder 121. The random number R and the result R' of the exclusive OR are EXCLUSIVE-ORed to extract the control signal CS2. The bit length of the random number can be set to the input bit length when a decoding operation is performed.

The random number generated by the random number generator 112 shown in FIG. 20 can be replaced with that used when the temporary key is generated. Since the latter random number is common to both a disc drive and a decoding unit, a process of encoding the random number and transmitting it, as shown in FIG. 20, can be deleted.

If the random number generated by the random number generator meets the conditions used for encryption, such as equal frequency, uncorrelation, long periodicity, nonlinearity, and unpredictability of the whole series having an arbitrary length, the encoder 114 and decoder 121 can be deleted and thus the processing steps and circuits can be simplified.

(Determination of Identification Information)

A method of determining identification information will now be descried.

This method employs a CSS (Content Scramble System) in a DVD. The CSS is explained in the above magazine, "DVD-Equipped Personal Computer," Nikkei Electronics, Aug. 18, 1997, No. 696, pp. 110–120. According to this magazine, there is a special area called a read-in area of the DVD disc, (which cannot be accessed from a logical file system) where encoded key information is stored.

Figure 21:
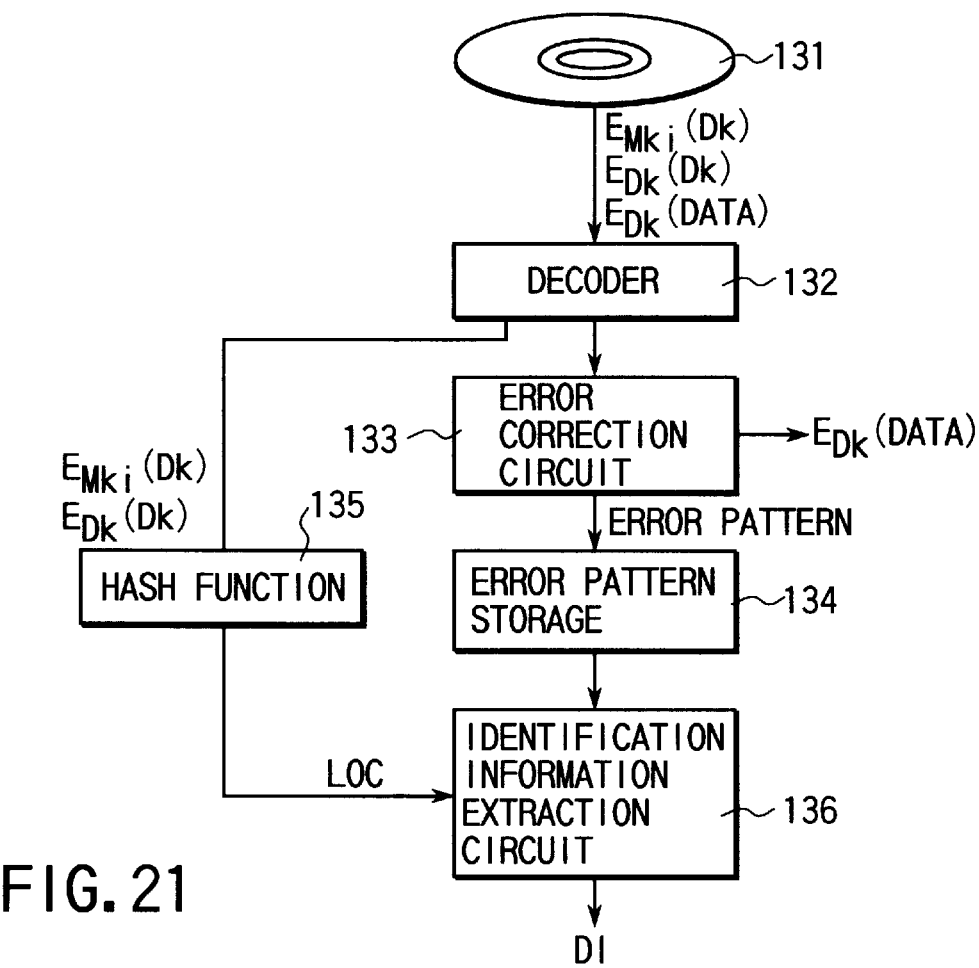
FIG. 21 is a block diagram illustrating a method of specifying a position of identification information using key information.

FIG. 21 shows a method of determining positional information of the identification information using encoded key information items EMki(Dk) and EDk(Dk). Only the elements necessary for describing this method are shown.

The encoded key information items EMki(Dk) and EDk(Dk) are read out of a DVD disc 131 and compressed using a hash function (data compression function) 135. These compressed information items correspond to positional information loc of the identification information. Using the positional information determination method, the insertion positions of the identification information are fixed in all product code blocks in the disc. If, however, the disc is replaced with another, the insertion positions of the identification information can be varied.

Consequently, the identification information insertion positions have to be calculated in advance by error-correction-coding contents data using the key information items EMki(Dk) and EDk(Dk) and the hash function before the identification information is inserted. The hash function needs to be always smaller than the length of the error-correction code of the product code blocks when the key information items EMki(Dk) and EDk(Dk) are input.

As described above, the key information items EMki(Dk) and EDk(Dk) compressed by the hash function 135 serve as positional information loc of the identification information. On the other hand, the readout encoded data EDk(Data) is decoded by a decoder 132 and error-corrected by an error-correction circuit 133. The circuit 133 corrects errors of both inner and outer codes.

An error pattern is obtained from error positional information and error symbol value acquired during the error correction of the encoded data EDk(Data) and stored in an error pattern storage 134. Thus, identification information DI is extracted based on the positional information loc of the identification information and the error pattern stored in the error pattern storage 134.

(Correction of Identification Information)

The case where identification information is equal to an error-correction code, will now be described.

Figure 22:
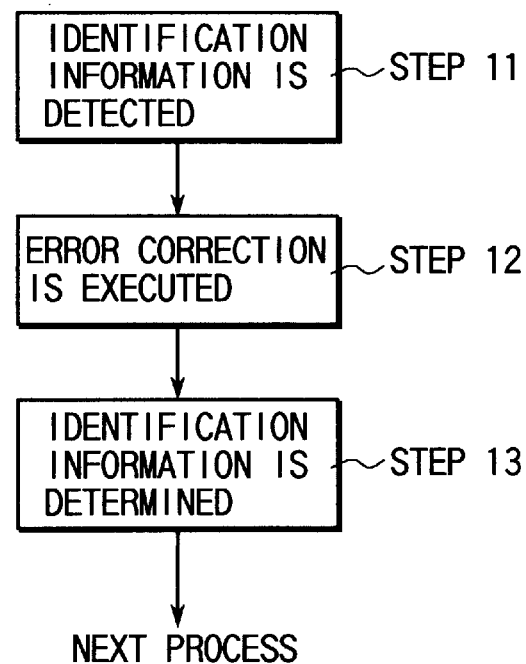
FIG. 22 is a flowchart showing an operation of determining identification information when an error-correction code is used in the identification information.

Assume that in the foregoing embodiments, the identification information corresponds to an error-correction code. FIG. 22 is a flowchart showing an operation of determining identification information when an error-correction code is used in the identification information.

Referring to FIG. 22, when identification information is detected (step 11), it is error-corrected using its error correction ability (step 12). The error-corrected identification information is determined (step 13). When an error-correction code is employed in the identification information, even though the decoded identification information includes an error, it is corrected using its error correction ability. Thus, it can correctly be determined whether identification information is present or not.

As described in detail, according to the present invention, since identification information representing whether is a recording medium is original or not is inserted in an error-correction code as an error and the identification information is extracted before its error correction, it can be determined whether the recording medium is original or not.

If the error correction is completed, the identification information is processed as an error and thus it is corrected to a correct symbol. For this reason, even though data is copied during the reproduction, the identification information for the original recording medium is lost and thus the illegally-copied recording medium becomes useless.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A copy-guard system comprising:

first decoding means for decoding digital data, which is encoded and error-correction-coded, from an information recording medium in which key information encoded for the digital data is recorded;

encoded digital data acquisition means for acquiring digital data encoded by error-correcting the digital data decoded by the first decoding means;

detection means for detecting an error position and an error symbol value of the encoded digital data acquired by the encoded digital data acquisition means;

identification information detection means for detecting an identification information that is replaced with a part of the digital data encoded and error-correction-coded based on the error position and the error symbol value detected by the detection means, wherein the identification information represents whether the information recording medium is original or copied;

first determination means for determining whether a copy of the information recording medium is protected based on the identification information detected by the identification information detection means; and copy protection means for protecting a copy of the information recording medium based on determination results of the first determination means.

2. The copy-guard system according to claim 1, further comprising:

second decoding means for decoding the key information from the information recording medium;

third decoding means for decoding the encoded digital data acquired by the encoded digital data acquisition means, based on the key information decoded by the second decoding means; and reproduction means for reproducing the digital data decoded by the third decoding means.

3. The copy-guard system according to claim 1, wherein the digital data is obtained by converting analog contents.

4. The copy-guard system according to claim 1, wherein the first determination means encodes a control signal indicative of the determination results and outputs the encoded control signal, and the copy protection means decodes the encoded control signal and protects a copy of the information recording medium in response to the decoded control signal.

5. The copy-guard system according to claim 1, wherein the identification information is replaced with a predetermined symbol of the error-correction-coded digital data.

6. The copy-guard system according to claim 1, wherein the first determination means comprises:

count means for counting a number of the identification information detected by the identification information detection means;

second determination means for determining whether the number of the identification information counted by the count means exceeds a predetermined value; and third determination means for determining whether a copy of the information recording medium is protected based on determination results of the second determination means.

7. The copy-guard system according to claim 1, wherein the first determination means determines whether copy of the information recording medium is protected based on positional information of the identification information detected by the identification information detection means.

8. The copy-guard system according to claim 1, wherein the first determination means comprises:

first conversion means for converting the control signal indicative of the determination results into a first control signal by performing a predetermined operation using a random number;

first encoding means for encoding the first control signal obtained by the first conversion means; and second encoding means for encoding the random number, and the copy protection means comprises:

second decoding means for decoding the first control signal encoded by the first encoding means;

third decoding means for decoding the random number encoded by the second encoding means;

second conversion means for converting the first control signal decoded by the second decoding means into the control signal by performing a predetermined operation using the random number decoded by the third decoding means; and means for protecting a copy in response to the control signal generated by the second conversion means.

9. The copy-guard system according to claim 1, wherein the identification information is an error correction code, and the identification information detection means corrects the identification information using an error correction ability of the error correction code.

10. A copy-guard system comprising:

first decoding means for decoding digital data, which is encoded and error-correction-coded by a product code, from an information recording medium in which key information encoded for the digital data is recorded;

first acquisition means for acquiring digital data encoded and error-correction-coded by an inner code when the digital data decoded by the first decoding means is error-corrected by an outer code;

detection means for detecting an error position and an error symbol value of the digital data acquired by the first acquisition means;

identification information detection means for detecting an identification information that is replaced with a part of the digital data encoded and error-correction-coded by the inner code based on the error position and the error symbol value detected by the detection means, wherein the identification information represents whether the information recording medium is original or copied;

first determination means for determining whether a copy of the information recording medium is protected based on the identification information detected by the identification information detection means; and copy protection means for protecting a copy of the information recording medium based on determination results of the first determination means.

11. The copy-guard system according to claim 10, further comprising:

second acquisition means for acquiring digital data encoded by error-correcting using the inner code the digital data, which is acquired by the first acquisition means;

second decoding means for decoding the key information from the information recording medium;

third decoding means for decoding the encoded digital data acquired by the second acquisition means, based on the key information decoded by the second decoding means; and reproduction means for reproducing the digital data decoded by the third decoding means.

12. The copy-guard system according to claim 10, wherein the digital data is obtained by converting analog contents.

13. The copy-guard system according to claim 10, wherein the first determination means encodes a control signal indicative of the determination results and outputs the encoded control signal, and the copy protection means decodes the encoded control signal and protects a copy of the information recording medium in response to the decoded control signal.

14. The copy-guard system according to claim 10, wherein the first determination means comprises:
    count means for counting a number of the identification information detected by the identification information detection means;
    second determination means for determining whether the number of the identification information counted by the count means exceeds a predetermined value; and
    third determination means for determining whether a copy of the information recording medium is protected based on determination results of the second determination means.

15. The copy-guard system according to claim 10, wherein the first determination means determines whether copy of the information recording medium is protected based on positional information of the identification information detected by the identification information detection means.

16. The copy-guard system according to claim 10, wherein the first determination means comprises:
    first conversion means for converting the control signal indicative of the determination results into a first control signal by performing a predetermined operation using a random number;
    first encoding means for encoding the first control signal obtained by the first conversion means; and
    second encoding means for encoding the random number, and
    the copy protection means comprises:
        second decoding means for decoding the first control signal encoded by the first encoding means;
        third decoding means for decoding the random number encoded by the second encoding means;
        second conversion means for converting the first control signal decoded by the second decoding means into the control signal by performing a predetermined operation using the random number decoded by the third decoding means; and
        means for protecting a copy in response to the control signal generated by the second conversion means.

17. The copy-guard system according to claim 10, wherein the identification information is an error correction code, and the identification information detection means corrects the identification information using an error correction ability of the error correction code.

18. The copy-guard system according to claim 10, wherein the first determination means determines whether a copy of the information recording medium is protected based on the error position and the error symbol value detected by the detection means and a pattern of the identification information stored in advance.

19. A copy-guard system comprising:
    first decoding means for decoding digital data, which is encoded and error-correction-coded by a product code, from an information recording medium in which key information encoded for the digital data is recorded;
    first acquisition means for acquiring digital data encoded and error-correction-coded by an inner code when the digital data decoded by the first decoding means is error-corrected by an outer code;
    first detection means for detecting a first error position and a first error symbol value of the digital data acquired by the first acquisition means;
    second acquisition means for acquiring digital data encoded by error-correcting the digital data, which is acquired by the first acquisition means, by the inner code;
    second detection means for detecting a second error position and a second error symbol value of the encoded digital data acquired by the second acquisition means;
    identification information detection means for detecting an identification information that is replaced with a part of the digital data encoded and error-correction-coded using the product code based on the first error position and the first error symbol value detected by the first detection means and the second error position and the second error symbol value detected by the second detection means, wherein the identification information represents whether the information recording medium is original or copied;
    first determination means for determining whether a copy of the information recording medium is protected based on the identification information detected by the identification information detection means; and
    copy protection means for protecting a copy of the information recording medium based on determination results of the first determination means.

20. The copy-guard system according to claim 19, further comprising:
    second decoding means for decoding the key information from the information recording medium;
    third decoding means for decoding the encoded digital data acquired by the second acquisition means, based on the key information decoded by the second decoding means; and
    reproduction means for reproducing the digital data decoded by the third decoding means.

21. The copy-guard system according to claim 19, wherein the digital data is obtained by converting analog contents.

22. The copy-guard system according to claim 19, wherein the first determination means encodes a control signal indicative of the determination results and outputs the encoded control signal, and the copy protection means decodes the encoded control signal and protects a copy of the information recording medium in response to the decoded control signal.

23. The copy-guard system according to claim 19, wherein the identification information is replaced with a predetermined symbol of the error-correction-coded digital data.

24. The copy-guard system according to claim 19, wherein the first determination means comprises:
    count means for counting a number of the identification information detected by the identification information detection means;
    second determination means for determining whether the number of the identification information counted by the count means exceeds a predetermined value; and third determination means for determining whether a copy of the information recording medium is protected based on determination results of the second determination means.

25. The copy-guard system according to claim 19, wherein the first determination means determines whether copy of the information recording medium is protected based on positional information of the identification information detected by the identification information detection means.

26. The copy-guard system according to claim 19, wherein the first determination means comprises:
   first conversion means for converting the control signal indicative of the determination results into a first control signal by performing a predetermined operation using a random number;
   first encoding means for encoding the first control signal obtained by the first conversion means; and
   second encoding means for encoding the random number, and
   the copy protection means comprises:
      second decoding means for decoding the first control signal encoded by the first encoding means;
      third decoding means for decoding the random number encoded by the second encoding means;
      second conversion means for converting the first control signal decoded by the second decoding means into the control signal by performing a predetermined operation using the random number decoded by the third decoding means; and
      means for protecting a copy in response to the control signal generated by the second conversion means.

27. The copy-guard system according to claim 19, wherein the identification information is an error correction code, and the identification information detection means corrects the identification information using an error correction ability of the error correction code.

28. A copy-guard system comprising:
   first decoding means for decoding digital data, which is encoded and error-correction-coded by a product code, from an information recording medium in which key information encoded for the digital data is recorded;
   identification information detection means for detecting an identification information that is replaced with a part of the digital data encoded and error-correction-coded using a product code based on the error position and the error symbol value detected by the detection means, wherein the identification information represents whether the information recording medium is original or copied;
   first determination means for determining whether a copy of the information recording medium is protected based on the identification information detected by the identification information detection means; and
   copy protection means for protecting a copy of the information recording medium based on determination results of the first determination means.

29. The copy-guard system according to claim 28, further comprising:
   second decoding means for decoding the key information from the information recording medium;
   acquisition means for acquiring digital data encoded by error-correcting the digital data, which is decoded by the first decoding means, by the product code;
   third decoding means for decoding the encoded digital data acquired by the acquisition means, based on the key information decoded by the second decoding means; and
   reproduction means for reproducing the digital data decoded by the third decoding means.

30. The copy-guard system according to claim 28, wherein the digital data is obtained by converting analog contents.

31. The copy-guard system according to claim 28, wherein the first determination means encodes a control signal indicative of the determination results and outputs the encoded control signal, and the copy protection means decodes the encoded control signal and protects a copy of the information recording medium in response to the decoded control signal.

32. The copy-guard system according to claim 28, wherein the identification information is replaced with a predetermined symbol of the error-correction-coded digital data.

33. The copy-guard system according to claim 28, wherein the first determination means comprises:
   count means for counting a number of the identification information detected by the identification information detection means;
   second determination means for determining whether the number of the identification information counted by the count means exceeds a predetermined value; and
   third determination means for determining whether a copy of the information recording medium is protected based on determination results of the second determination means.

34. The copy-guard system according to claim 28, wherein the first determination means determines whether copy of the information recording medium is protected based on positional information of the identification information detected by the identification information detection means.

35. The copy-guard system according to claim 28, wherein the first determination means comprises:
   first conversion means for converting the control signal indicative of the determination results into a first control signal by performing a predetermined operation using a random number;
   first encoding means for encoding the first control signal obtained by the first conversion means; and
   second encoding means for encoding the random number, and
   the copy protection means comprises:
      second decoding means for decoding the first control signal encoded by the first encoding means;
      third decoding means for decoding the random number encoded by the second encoding means;
      second conversion means for converting the first control signal decoded by the second decoding means into the control signal by performing a predetermined operation using the random number decoded by the third decoding means; and
      means for protecting a copy in response to the control signal generated by the second conversion means.

36. The copy-guard system according to claim 28, wherein the identification information is an error correction code, and the identification information detection means corrects the identification information using an error correction ability of the error correction code.

37. A copy-guard system comprising:
   first decoding means for decoding digital data, which is encoded and error-correction-coded, from an information recording medium in which key information encoded for the digital data is recorded;

encoded digital data acquisition means for acquiring digital data encoded by error-correcting the digital data decoded by the first decoding means;

detection means for detecting an error position and an error symbol value of the encoded digital data acquired by the encoded digital data acquisition means;

second decoding means for decoding the digital data acquired by the encoded digital data acquisition means;

extraction means for extracting positional information of an identification information, which is embedded in the digital data decoded by the second decoding means, as watermark data;

identification information detection means for detecting the identification information that is replaced with a part of the digital data encoded and error-correction-coded based on the error position and the error symbol value detected by the detection means and the positional information of identification information extracted by the extraction means, wherein the identification information represents whether the information recording medium is original or copied;

determination means for determining whether a copy of the information recording medium is protected based on the identification information detected by the identification information detection means; and copy protection means for protecting a copy of the information recording medium based on determination results of the determination means.

38. A copy-guard system comprising:

decoding means for decoding digital data, which is encoded and error-correction-coded, from an information recording medium in which key information encoded for the digital data is recorded;

encoded digital data acquisition means for acquiring digital data encoded by error-correcting the digital data decoded by the decoding means;

detection means for detecting an error position and an error symbol value of the encoded digital data acquired by the encoded digital data acquisition means;

compression means for compressing the key information encoded and stored in the information recording medium;

extraction means for extracting an identification information based on the key information compressed by the compression means and the error position and the error symbol value detected by the detection means, wherein the identification information represents whether the information recording medium is original or copied;

determination means for determining whether a copy of the information recording medium is protected based on the identification information extracted by the extraction means; and copy protection means for protecting a copy of the information recording medium based on determination results of the determination means.

39. A computer program product for operating a computer, the computer program product comprising:

a computer readable medium;

digital data encoded and error-correction coded, the digital data including an identification information that is replaced with part of the digital data and recorded, wherein the identification information represents whether the computer readable medium is original or copied; and key information encoded for the digital data encoded and error-correction-coded, wherein each of the digital data and the encoded key information is recorded on the computer readable medium in executable form and loadable into the computer for execution by a processor.

40. A method for protecting information, comprising:

decoding digital data, which is encoded and error-correction-coded, from an information recording medium in which key information encoded for the digital data is recorded;

acquiring digital data encoded by error-correcting the decoded digital data;

detecting an error position and an error symbol value of the acquired encoded digital data;

detecting an identification information that is replaced with a part of the encoded and error-correction-coded digital data encoded and error-correction-coded based on the detected error position and error symbol value, wherein the identification information represents whether the information recording medium is original or copied;

determining whether a copy of the information recording medium is protected based on the detected identification information; and protecting a copy of the information recording medium based on the determination.

\* \* \* \* \*

UNITED STATES PATENT AND TRADEMARK OFFICE
CERTIFICATE OF CORRECTION

PATENT NO. : 6,556,679 B1
DATED : April 29, 2003
INVENTOR(S) : Kato et al.

It is certified that error appears in the above-identified patent and that said Letters Patent is hereby corrected as shown below:

<u>Column 18,</u>
Line 59, change "code the" to -- code of the --.

Signed and Sealed this

Twelfth Day of August, 2003

JAMES E. ROGAN
*Director of the United States Patent and Trademark Office*